United States Patent
Ando et al.

(10) Patent No.: US 6,999,395 B2
(45) Date of Patent: Feb. 14, 2006

(54) INFORMATION STORAGE MEDIUM, INFORMATION RECORDING APPARATUS, AND INFORMATION REPRODUCTION APPARATUS

(75) Inventors: Hideo Ando, Hino (JP); Chosaku Noda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 10/234,402

(22) Filed: Sep. 5, 2002

(65) Prior Publication Data

US 2003/0048727 A1 Mar. 13, 2003

(30) Foreign Application Priority Data

Sep. 12, 2001 (JP) ........................................ 2001-276727

(51) Int. Cl.
*G11B 7/00* (2006.01)

(52) U.S. Cl. .................................. 369/59.23; 369/275.3

(58) Field of Classification Search ............... 369/59.23, 369/275.3, 59.1, 59.24, 59.22

See application file for complete search history.

(56) References Cited

U.S. PATENT DOCUMENTS

| | | |
|---|---|---|
| 5,587,991 A | 12/1996 | Nabeshima et al. |
| 5,666,338 A | 9/1997 | Ishizawa et al. |
| 5,848,051 A | 12/1998 | Ishizawa et al. |
| 5,909,417 A | 6/1999 | Ishizawa et al. |
| 5,956,306 A | 9/1999 | Ishizawa et al. |
| 6,600,431 B1 * | 7/2003 | Shim et al. .................... 341/59 |
| 2003/0026186 A1 | 2/2003 | Ando et al. |

FOREIGN PATENT DOCUMENTS

| | | |
|---|---|---|
| EP | 0673029 A1 | 12/1994 |
| JP | 5-225710 A | 9/1993 |
| JP | 7-254239 | 10/1995 |
| JP | 09-162857 A | 6/1997 |
| JP | 10049997 | 2/1998 |
| JP | 10-275358 | 10/1998 |
| JP | 2000-332613 | 11/2000 |
| JP | 2001-101806 A | 4/2001 |

OTHER PUBLICATIONS

Japanese Office Action dated Feb. 1, 2005 for Appln. No. 2001-276727.
Japanese Office Action dated Jul. 27, 2004 for Application No. 2001-276727.
Japanese Office Action dated May 31, 2005 for Appln. No. 2001-276727.

* cited by examiner

*Primary Examiner*—Nabil Hindi
(74) *Attorney, Agent, or Firm*—Pillsbury Winthrop Shaw Pittman, LLP

(57) ABSTRACT

An information storage medium according to an embodiment of this invention has an area for storing predetermined data modulated according to the (d, k; m, n) modulation rule. The predetermined data includes at least one SYNC code in a predetermined recording unit, and the number of "1"s included in a predetermined number of a series of channel bits at an arbitrary position in the SYNC code is not more than a half the predetermined number.

11 Claims, 38 Drawing Sheets

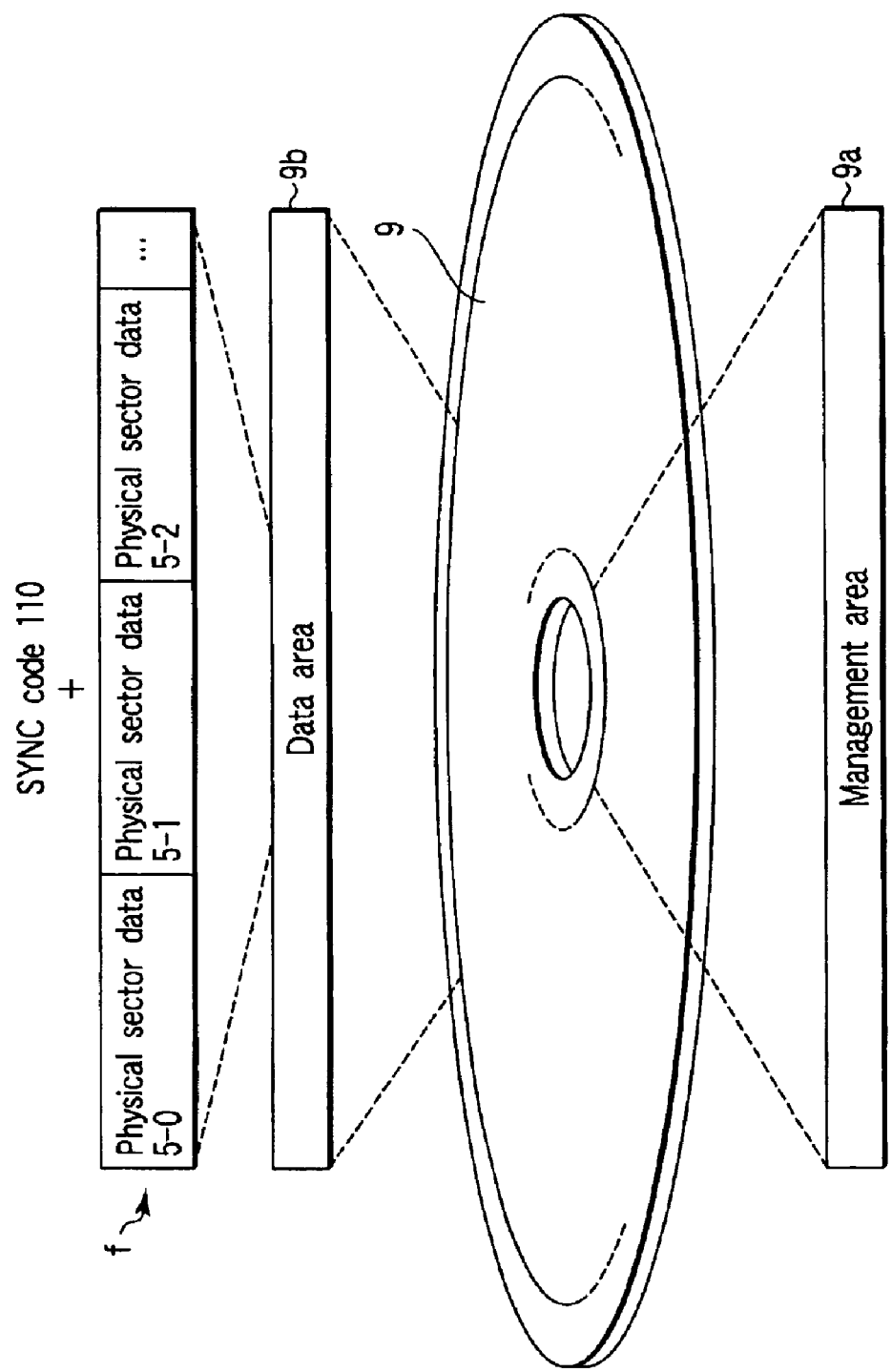
F I G. 8

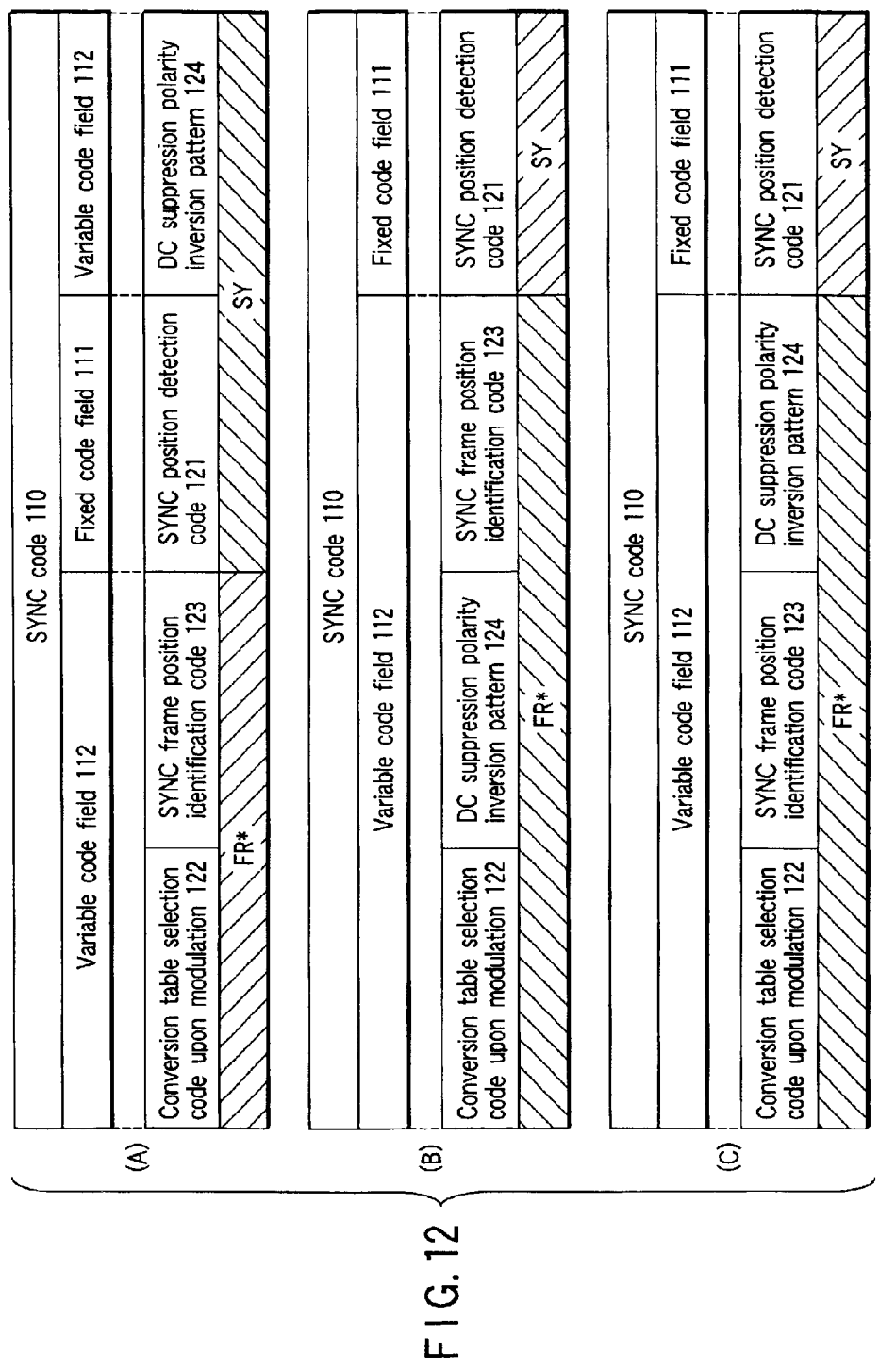
F I G. 12

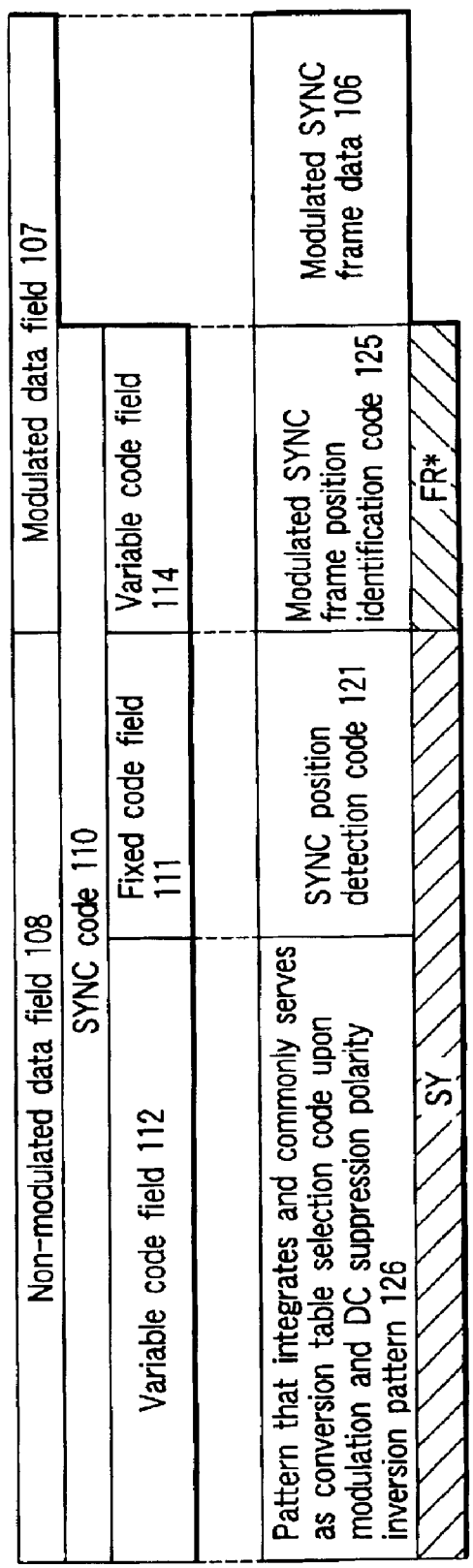
F I G. 20

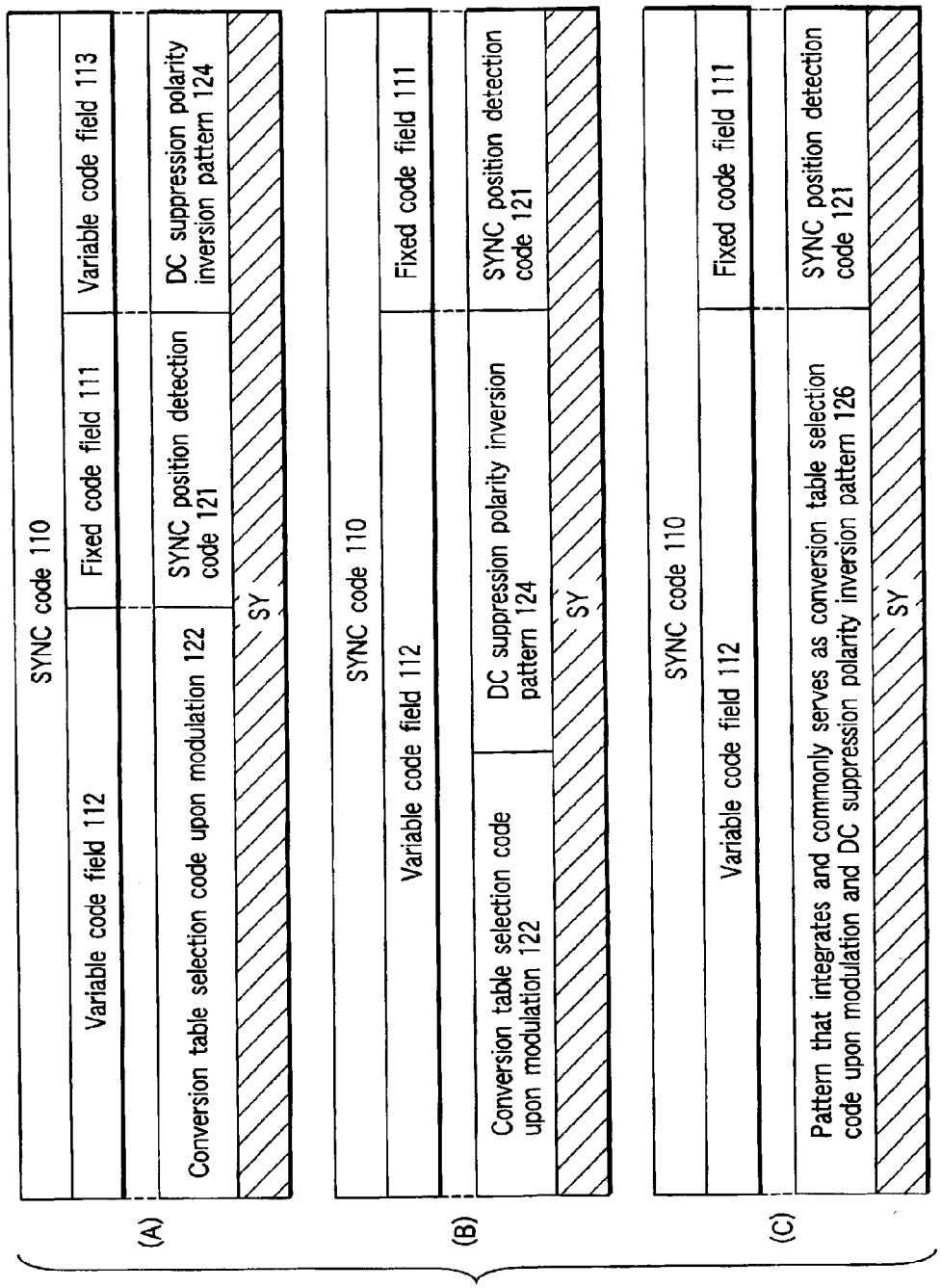
F I G. 21

F I G. 37

INFORMATION STORAGE MEDIUM, INFORMATION RECORDING APPARATUS, AND INFORMATION REPRODUCTION APPARATUS

CROSS-REFERENCE TO RELATED APPLICATIONS

This application is based upon and claims the benefit of priority from the prior Japanese Patent Application No. 2001-276727, filed Sep. 12, 2001, the entire contents of which are incorporated herein by reference.

BACKGROUND OF THE INVENTION

1. Field of the Invention

The present invention relates to an information storage medium that records data containing a SYNC code. The present invention also relates to an information recording apparatus for recording data containing a SYNC code on an information storage medium. Furthermore, the present invention relates to an information reproduction apparatus for reproducing data containing a SYNC code from an information storage medium.

2. Description of the Related Art

The DVD format specifies the contents of a SYNC code. In this specification, there are a total of 32 different SYNC codes. The SYNC codes are described in Jpn. Pat. Appln. KOKAI Publication No. 7-254239.

In the existing DVD standard, in order to limit the pit length of a three-dimensional pattern or the maximum mark length of a recording mark (the run length of "0"s allocated between neighboring "1"s in channel bit data), source data undergoes a modulation process based on a specific modulation rule, and the modulated data is recorded on an information storage medium. A modulation method is generally expressed by (d, k; m, n), which symbols mean that "m-bits" source data is converted into data of "n-channel bits", and a modulated channel bit pattern has a minimum of "d" "0"s run length and a maximum of "k" "0"s run length. That is, the modulated channel bit patterns satisfy conditions that a minimum of "d" pieces of "0"s successively arranged and a maximum of "k" pieces of "0"s successively arranged. The modulation method in the existing DVD standard adopts a (2, 10; 8, 16) method (i.e., "d=2", "k=10").

In the next-generation DVD, the recording density is to be further improved. Accordingly, low SYNC code detection precision may pose a problem.

BRIEF SUMMARY OF THE INVENTION

It is an object of the present invention to provide an information storage medium compatible to high-density recording.

An information storage medium according to an embodiment of the present invention comprises a management area that stores management information, and a data area that stores predetermined data in predetermined recording units, the predetermined data is modulated according to a (d, k; m, n) modulation rule, the (d, k; m, n) modulation rule modulates m-bit source data into n-channel bit data, so that modulated channel bit patterns satisfy conditions that a minimum of "d" pieces of "0"s successively arranged and a maximum of "k" pieces of "0"s successively arranged, the predetermined data includes at least one SYNC code in the predetermined recording unit, and the number of "1"s included in a predetermined number of a series of channel bits at an arbitrary position in the SYNC code is not more than a half the predetermined number.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 shows an example of the data structure of an information storage medium;

FIG. 12 shows the second example of the data structure of a SYNC code;

FIG. 20 shows the 10th example of the data structure of a SYNC code;

FIG. 21 shows the 11th example of the data structure of a SYNC code;

FIG. 37 shows a list of SYNC codes shown in FIG. 33; and

DETAILED DESCRIPTION OF THE INVENTION

An embodiment of the present invention will be described hereinafter with reference to the accompanying drawings.

As methods of further improving the recording density in a next-generation DVD, 1) a method of generally increasing the recording density while d=2 (to shorten the relative channel bit length), and 2) a method of changing the modulation scheme of d=1, and using PRML (Partial Response Maximum Likelihood) in a reproduction circuit are available.

Even when either of these methods is adopted, the signal amplitude of a reproduced signal from a repetition position of the densest pattern (the resolution representing the amplitude ratio to the signal amplitude at a repetition position of the coarsest pattern) drops considerably. A method of improving the reliability of a reproduced signal using the above PRML technique against a signal amplitude drop of the reproduced signal from the repetition position of the densest pattern is being developed currently.

In general, an information reproduction apparatus or information recording/reproduction apparatus associated with an information storage medium such as an optical disk or the like adopts "SYNC detection" upon reproducing data recorded on the information storage medium. "SYNC detection" is a method of extracting a reference clock (reproducing a carrier) from a signal reproduced from data recorded on an information storage medium, and decoding data recorded on the information storage medium in synchronism with the timing of this reference clock (carrier). Especially, when a signal amplitude drop of a reproduced signal from the repetition position of the densest pattern is considerable, the timing of this reference clock deviates, and data cannot be precisely reproduced even using the PRML technique.

In the existing DVD standard, SYNC codes are inserted at specific data intervals. Upon reproducing information from an information storage medium, an information reproduction apparatus or information recording/reproduction apparatus detects the insertion position of each SYNC code, and extracts a gap position of data contiguously recorded on the information storage medium with reference to this SYNC code. Especially, this SYNC code has no error correction code unlike in general user data (SYNC frame data 105 in FIG. 1). Therefore, the information reproduction apparatus or information recording/reproduction apparatus is required to have very high detection precision of SYNC codes.

Figure 38:
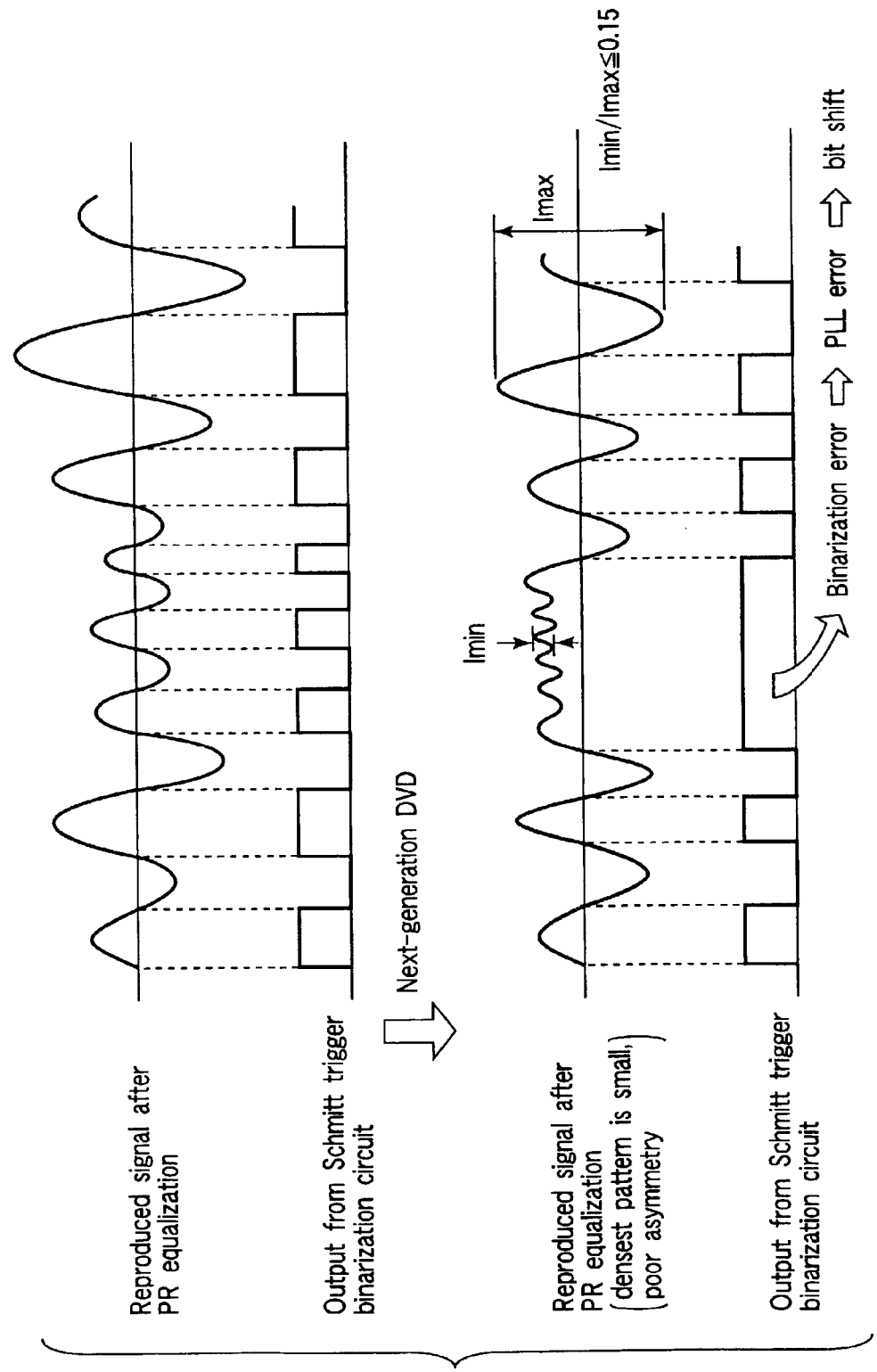
FIG. 38 is a view showing reproduced signals of an existing DVD and next-generation DVD, and for explaining problems of the next-generation DVD.

In order to further improve the recording density in the next-generation DVD, the detection precision of SYNC codes lowers considerably since the timing of a reference clock deviates (bit shift occurs) near the repetition position of the densest pattern in a SYNC code. FIG. 38 shows such state. In FIG. 38, the upper reproduced signal indicates that of the existing DVD, and the lower reproduced signal indicates that of the next-generation DVD. In the next-generation DVD, the densest amplitude/coarsest amplitude= Imin/Imax≦0.15. In the reproduced signal of the next-generation DVD, if the densest amplitude is small and asymmetry is poor, the timing of a reference clock of a reference clock generation circuit deviates and a bit shift may occur due to binarization errors in a Schmitt trigger circuit and PLL errors in a PLL circuit.

Features of the present invention will be summarized first.

As a pattern for a SYNC code that can assure high detection precision of the SYNC code even when the recording density of an information storage medium is improved, the number of times of repetition of the densest patterns in the SYNC code is limited, or a generation state of a pattern approximate to the densest pattern is constrained.

As a result (of the above device of the SYNC code pattern), the range of the amplitude value of a reproduced signal from the SYNC code is broadened, the reference clock extraction (carrier reproduction) precision by "SYNC detection" using a reproduced signal from the SYNC code position is improved, and the frequency of occurrence of timing deviation (bit shift) of a reference clock at the SYNC code position is decreased, thereby improving the detection precision of the SYNC code.

The SYNC code pattern in the present invention has the following features.

(1-1) A condition for limiting the number of times of repetition of the densest patterns from every SYNC code patterns, or for constraining the generation state of a pattern approximate to the densest pattern is set.

(1-2) The ratio of SYNC code patterns that meet the above condition to sets of SYNC code patterns to be used in practice is increased (set at a specific occupation ratio or higher).

(1-3) As a condition setting method of the SYNC code pattern, a specific condition is applied to the frequency of occurrence of "1" within the range of a specific channel bit length N (indicating the bit boundary position of a three-dimensional pattern or the mark edge position of a recording mark when a mark length recording method based on an NRZI (Non Return to Zero Invert) method is used).

(1-4) As a condition setting method of the SYNC code pattern, the "condition of (1-3)" is met everywhere in a SYNC code data area.

As shown in FIGS. 22, 33, 34, and 35, the data size of a SYNC code in an embodiment of the present invention is 24 or 32 channel bits. If the condition is set for every data size (24 or 32 channel bits) of the SYNC code, the following problems are posed.

(2-1) Since the condition must be set for every SYNC codes, the condition to be set becomes complicated.

(2-2) Pattern matching for all patterns is required, and it becomes troublesome to check if the condition is met.

(2-3) If the data size of the SYNC code has changed, the condition must be changed. Hence, versatility upon changing the data size of a SYNC code or a modulation method becomes poor.

By contrast, if it is determined in the present invention that a discrimination unit (1 channel byte or more) smaller than the data size (24 or 32 channel bits) unit of a SYNC code is set, and the condition is met everywhere in the SYNC code area as in (1-3) and (1-4) above, the following effects are obtained.

(3-1) The condition to be set for the SYNC code can be greatly simplified.

(3-2) Since the condition to be set is simple, it becomes very easy to check if the condition is met.

(3-3) High condition versatility that is hardly influenced even when the data size of the SYNC code or the modulation method has changed can be assured.

Many information recording/reproduction apparatuses or information reproduction apparatuses execute data processes for respective bytes (8 bits). Therefore, at least 8 channel bits are required as the "specific channel bit length" that designates the range in the condition of (3-3) (in the present invention, modulated bits are expressed as channel bits). The present invention will define a method of setting the "specific channel bit length" to have "8+1" channel bits as a starting point in consideration of a slight margin for 8 channel bits so that the condition of the present invention can be applied even when the d value or various states have changed upon modulation.

Figure 34:
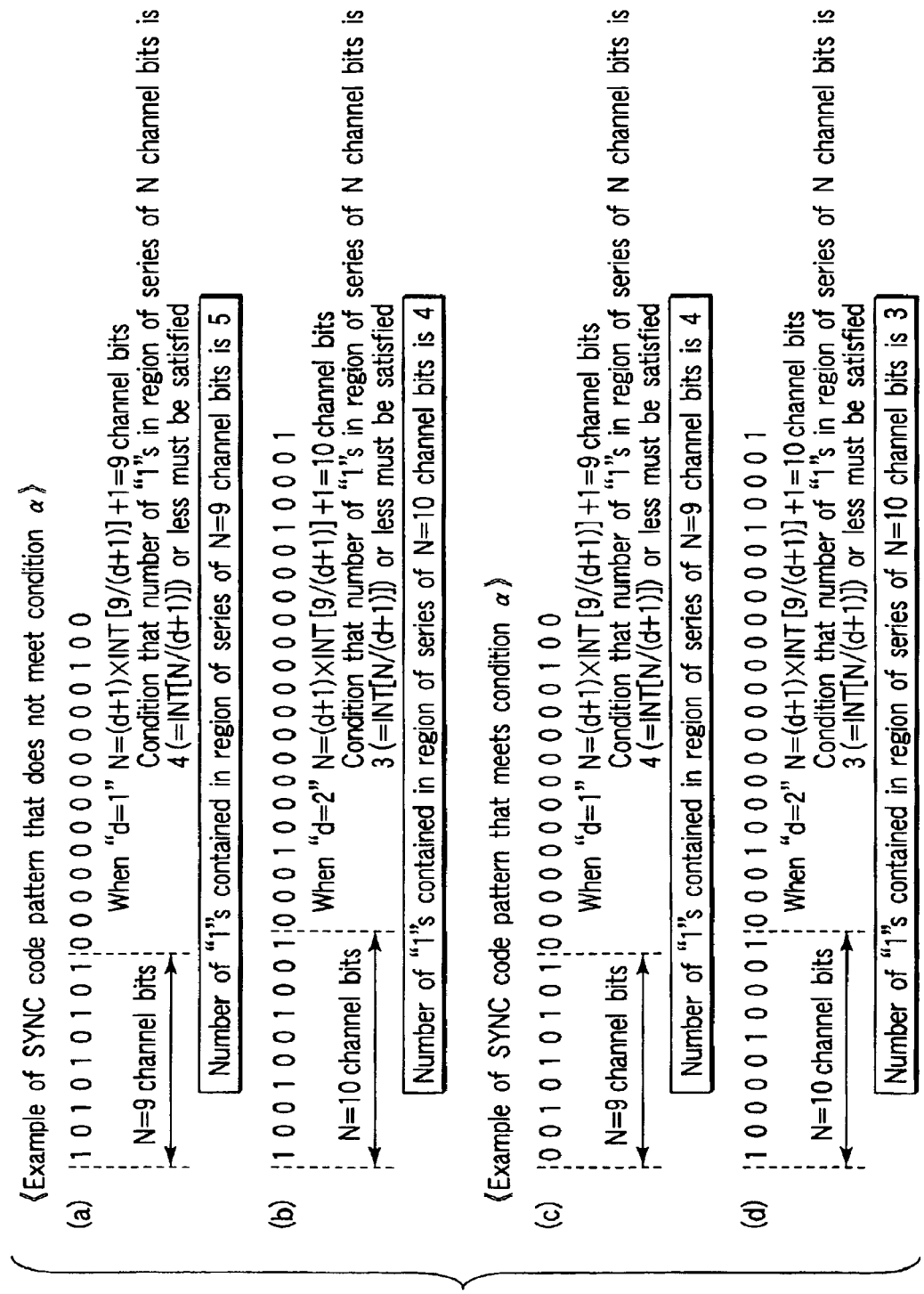
FIG. 34 is a view for explaining condition α required for SYNC codes.

When d=1, a repetition pattern of the densest patterns within a channel bit range of 8 channel bits or more requires 9 channel bits, i.e., "101010101", as shown in portion (a) in FIG. 34, and after a d+1 (=2) channel bit pattern repeats itself four times, "1" is inserted. On the other hand, when d=2, 10 channel bits, i.e., "1001001001", are required, as shown in portion (b) in FIG. 34, and after a d+1 (=3) channel bit pattern repeats itself three times, "1" is inserted.

A characteristic feature of the present invention lies in that the value of the "specific channel bit length N" is designated by the number of channel bits obtained by adding one channel bit required to insert "1" at the end of the pattern to a repetition pattern of the densest patterns of 8 channel bits or more. Irrespective of the d value that represents the "0" run length in the densest pattern after modulation (by providing versatility independently of the modulation method), the number of times of repetition of the densest patterns equal to or larger than 8 channel bits is given, to have "8+1" channel bits as the starting point, by:

$$\text{INT}[9/(d+1)] \tag{1}$$

where INT[X] is an integer obtained by dropping digits after the decimal point of real number X. Since the number of channel bits for one period of the densest pattern is "d+1", the number of channel bits obtained upon repetition by the number of times given by formula (1) is given by:

$$(d+1) \times \text{INT}[9/(d+1)] \tag{2}$$

Since the number of channel bits obtained by adding 1 channel bit required to insert "1" at the end of the pattern to formula (2) corresponds to the "specific channel bit length N", the specific channel bit length N indicating the range for designating the constraint condition of the SYNC code is given by:

$$N=(d+1) \times \text{INT}[9/(d+1)]+1 \tag{3}$$

As shown in FIG. 34, from equation (3), we have:

$N=9$ channel bits when $d=1$ $N=10$ channel bits when $d=2$

As the constraint condition of the SYNC code pattern, the present invention defines "condition α" as a condition that excludes patterns in which the first and last bits in N channel bits are "1", and all bits between these bits are repetition of densest patterns. In a pattern of N=9 channel bits from the head shown in portion (a) in FIG. 34, since the number of channel bits of a repetition pattern of one densest pattern is d+1 channel bits, the number of "1"s in N channel bits is given by:

$$\text{INT}[N/(d+1)]+1=5 \tag{4}$$

Hence, if "condition α" is expressed by a numerical value, the number of "1"s included in N channel bits can be limited to not more than:

$$\text{INT}[N/(d+1)] \tag{5}$$

When d=1, since the pattern in portion (a) in FIG. 34 includes five "1"s within N=9 channel bits, it does not meet "condition α", and is not suitable for a SYNC code pattern in the present invention. A pattern shown in portion (c) in FIG. 34 meets "condition α", and can be used as a SYNC code pattern of the present invention, since there are four "1"s (INT[N/(d+1)]=4) within N=9 channel bits. Likewise, when d=2, INT[N/(d+1)]=3. A pattern in portion (b) in FIG. 34 does not meet "condition α", and a pattern in portion (d) in FIG. 34 meets "condition α". The existing DVD standard adopts a pattern in portion (b) in FIG. 34 as a part of a SYNC code. At the recording density of the existing DVD, a SYNC pattern can be detected without any problem if "condition α" is not met. A characteristic feature of the present invention lies in that the SYNC pattern detection precision is improved by excluding patterns which do not meet "condition α" from the SYNC codes when the recording density is to be further improved as in the present invention.

Figure 3:
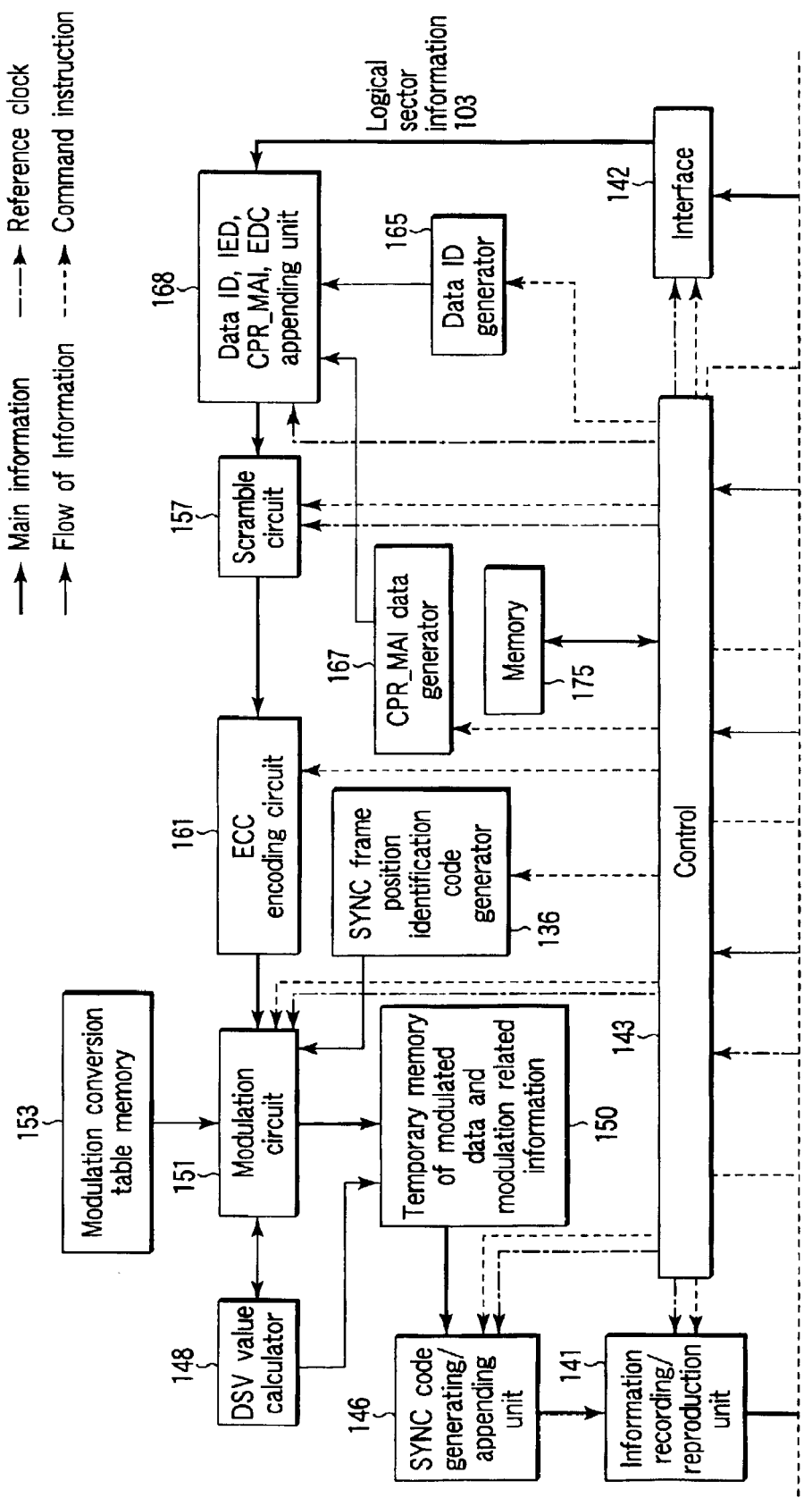
FIG. 3 is a block diagram showing a recording system of an information recording/reproduction apparatus according to an embodiment of the present invention.
Figure 4:
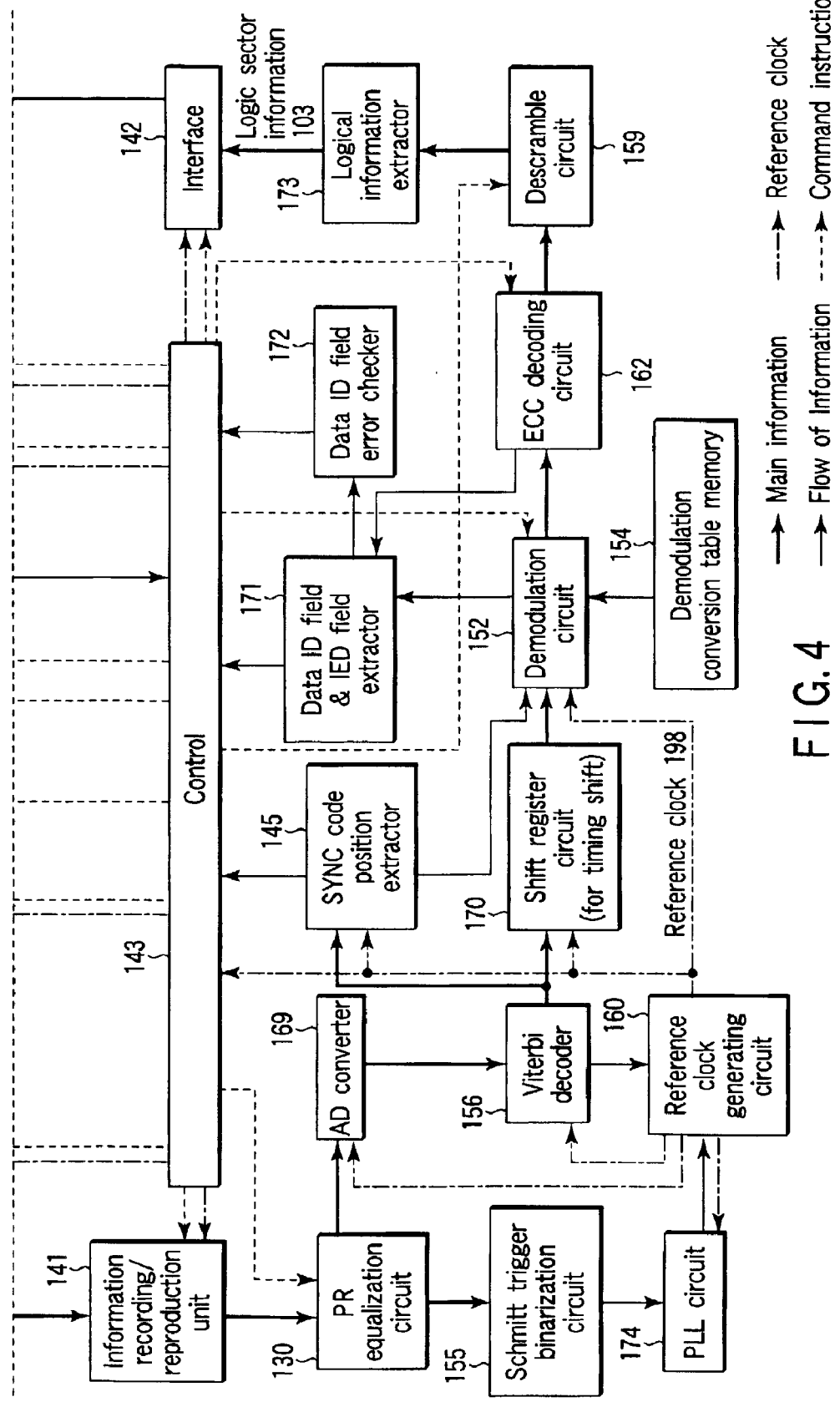
FIG. 4 is a block diagram showing a reproduction system of the information recording/reproduction apparatus according to an embodiment of the present invention.

When the recording density on an information storage medium has been improved, signal detection must be done using the PRML method that uses a PR equalization circuit 130 and Viterbi decoder 156 of a recording/reproduction apparatus shown in FIGS. 3 and 4. When PRML is used, an effect of setting a higher density is expected upon adopting the modulation method of d=1 rather than that of d=2. Therefore, especially in respective conditions, those for d=1 will be explained in more detail. That is, in "condition α" of the present invention, when d=1, "the number of "1"s must be set to be 4 or less within 9 channel bits".

"Condition α" constrains the repetition pattern of the densest patterns. In the present invention, "condition β" and "condition γ" are used to limit the ratio of adopting patterns approximate to repetition of the densest patterns. "Condition β" and "condition γ" are set by slightly moderating equation (3) and formula (5).

That is, in "condition β" of the present invention, the number of "1"s within an area of continuous N−1 channel bits is limited to not more than:

$$\text{INT}[(N-1)/(d+1)] \quad (6)$$

Under this condition, the number of "1"s within 8 channel bits is limited to 3 or less when d=1, and the number of "1"s within 9 channel bits is limited to 2 or less when d=2.

Figure 35:
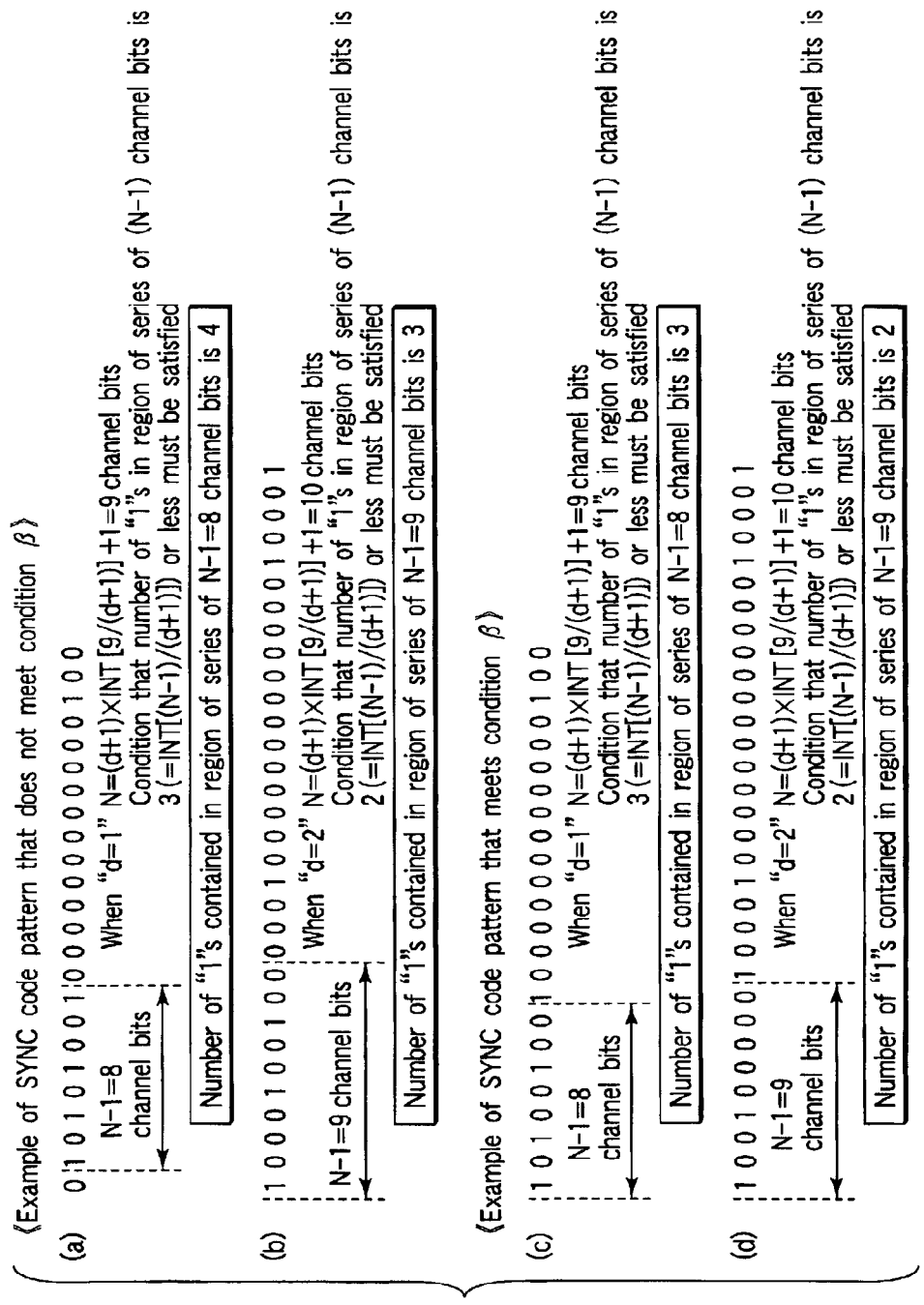
FIG. 35 is a view for explaining condition β required for SYNC codes.

Portions (a) and (b) in FIG. 35 show patterns which do not meet "condition β", and portions (c) and (d) in FIG. 35 show patterns which meet "condition β". In the existing DVD, the ratio of patterns which meet "condition β" to all patterns adopted as SYNC codes is as low as 65.6%. In order to improve the density to be higher than that of the existing DVD and to improve the SYNC code detection precision, a large characteristic feature of the present invention lies in that the ratio of adopting patterns that meet "condition β" is set to be at least 66%. In order to further improve the SYNC code detection precision, preferably, the ratio of adopting patterns that meet "condition β" must be set to be 75% or higher.

In "condition γ" of the present invention, the number of "1"s within 7 channel bits is limited to 3 or less, and 75% or more of all SYNC code patterns are set to be patterns which meet "condition γ".

FIGS. 22, 33, 36, and 37 show embodiments of SYNC code patterns which are set in consideration of the above conditions.

Figure 22:
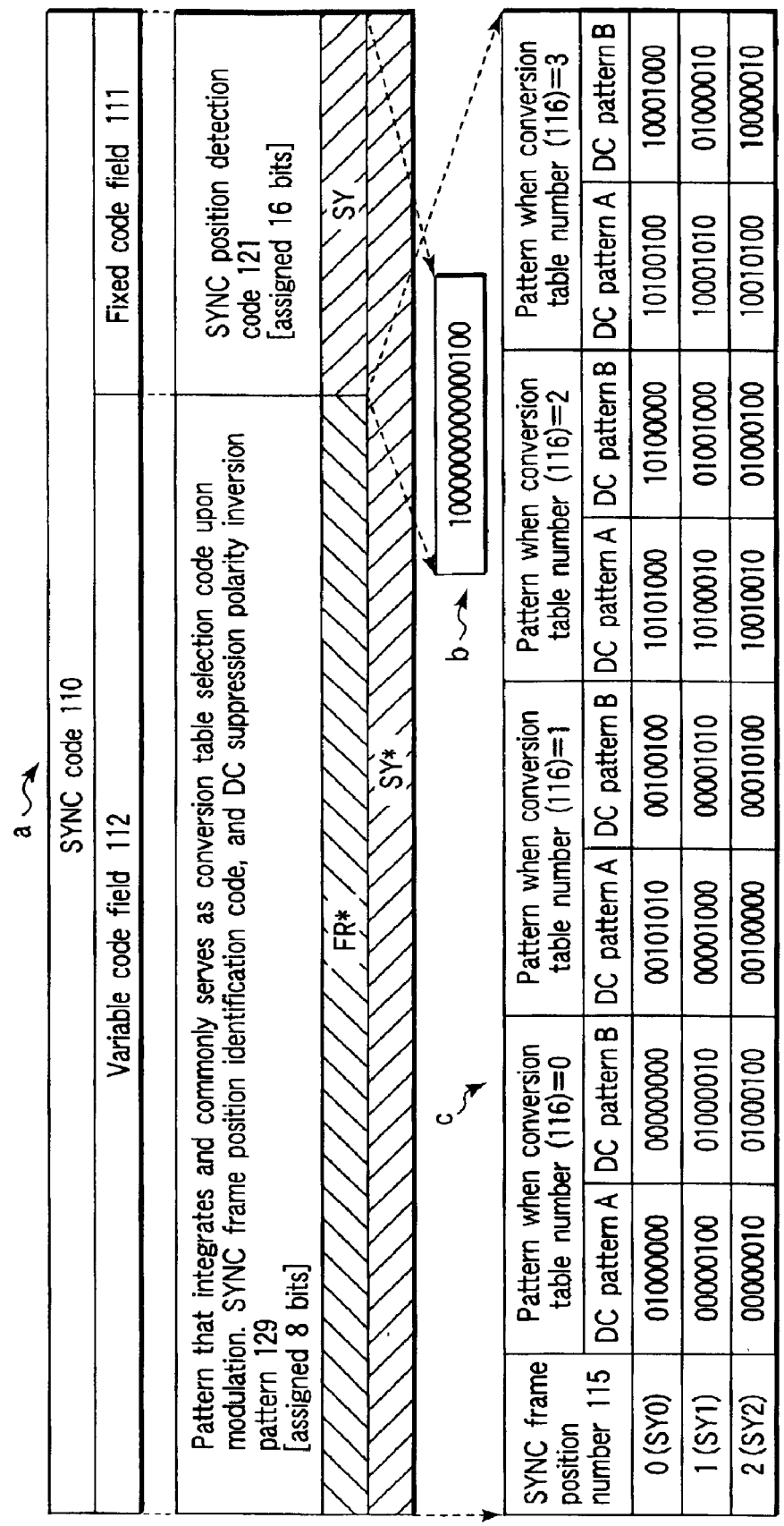
FIG. 22 shows an example of the bit pattern of a SYNC code.
Figure 33:
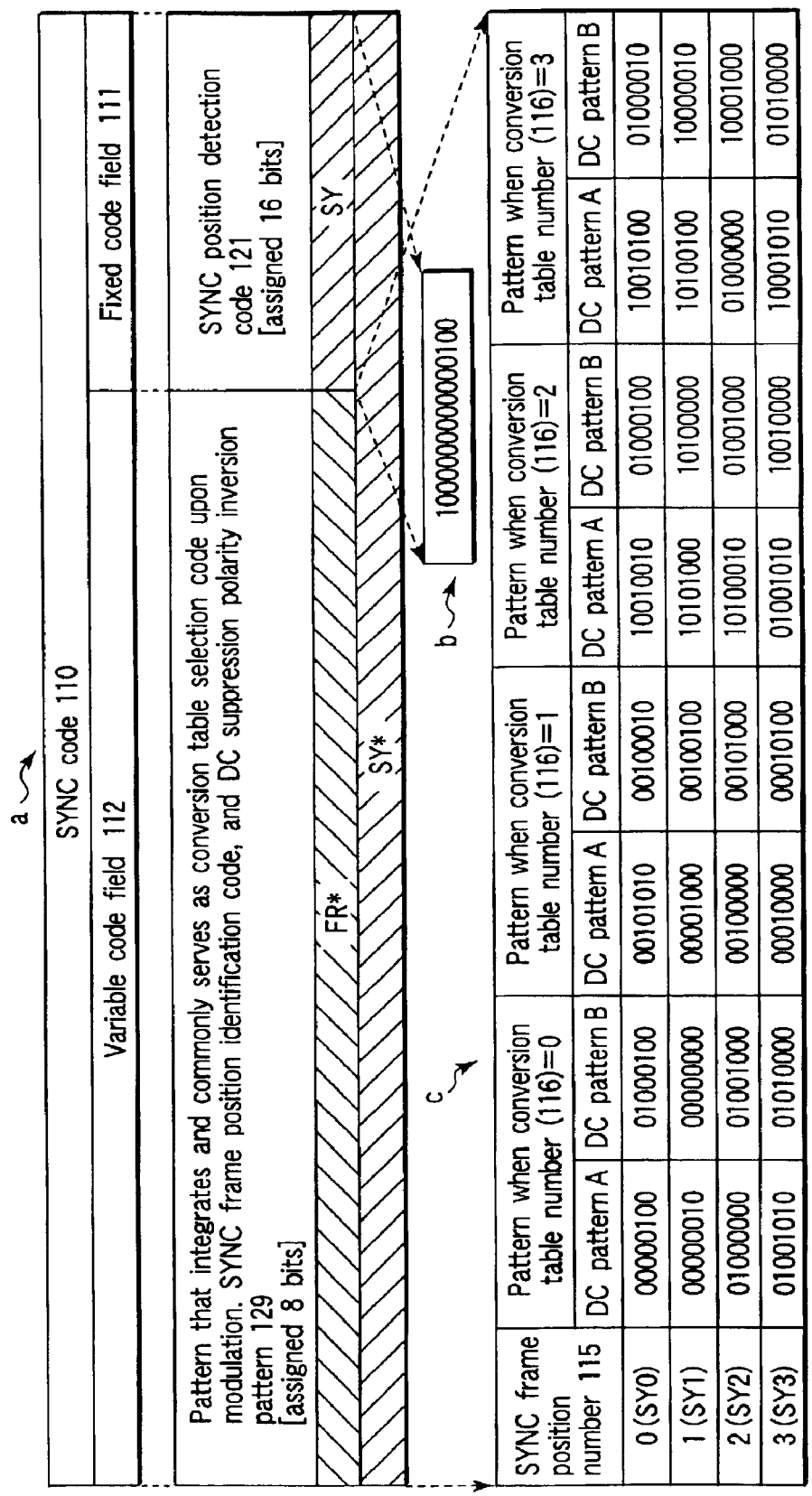
FIG. 33 is a view for explaining a practical bit pattern corresponding to SYNC codes shown in FIG. 32.

The pattern of a SYNC position detection code 121 shown in FIGS. 22 and 33 has the following features.

1) The spacing between neighboring "1"s is larger than the maximum length that can be generated by a modulation rule (in this example, "k+3" "0"s run, or "k+3" pieces of "0"s run).

2) All patterns meet condition α.

3) 66% or more patterns of all patterns meet condition β.

Figure 36:
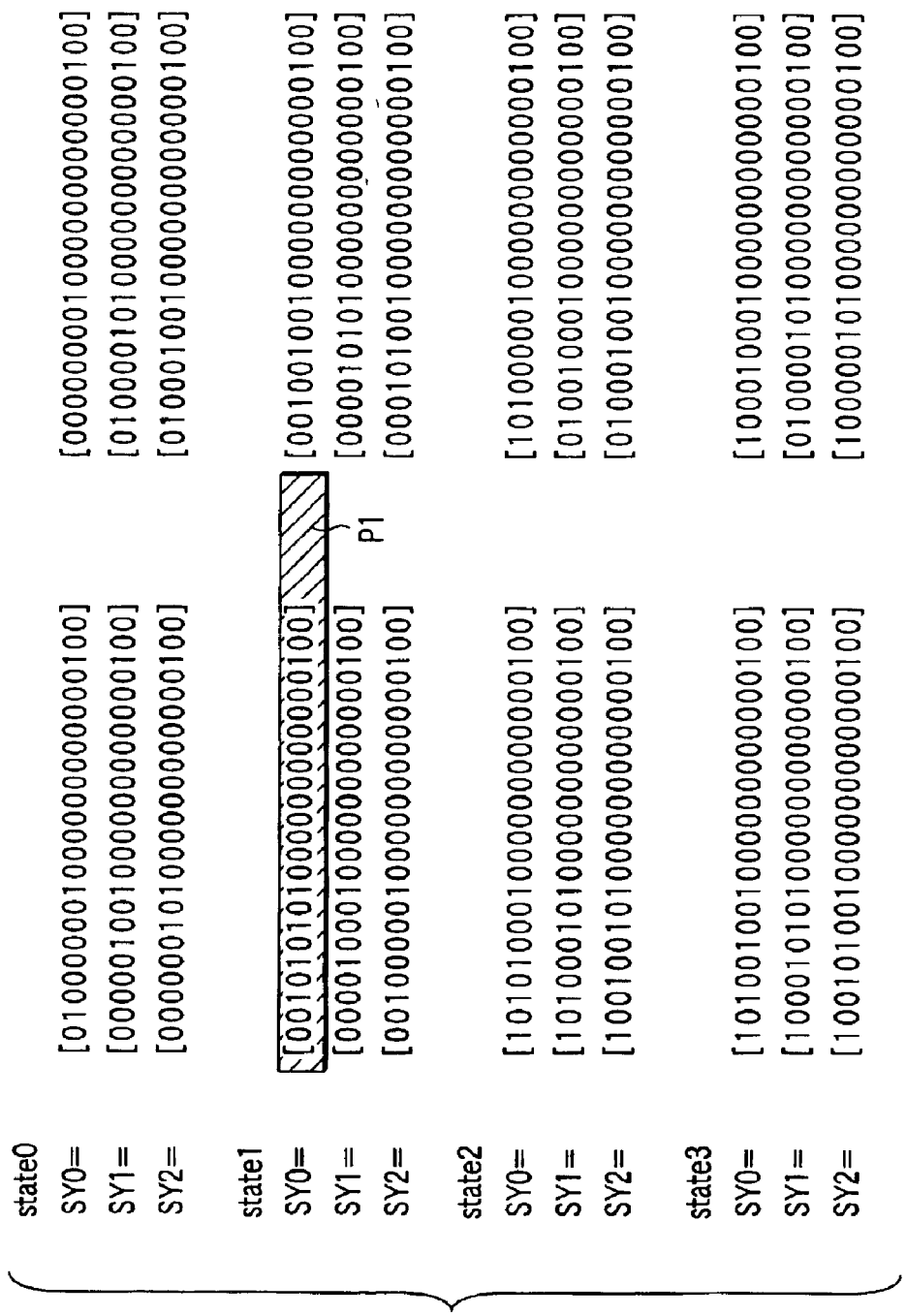
FIG. 36 shows a list of SYNC codes shown in FIG. 22.

Pattern P1 shown in FIG. 36 does not conform to "condition γ". All patterns shown in FIG. 36 meet "condition α" and "condition β".

Figure 37:
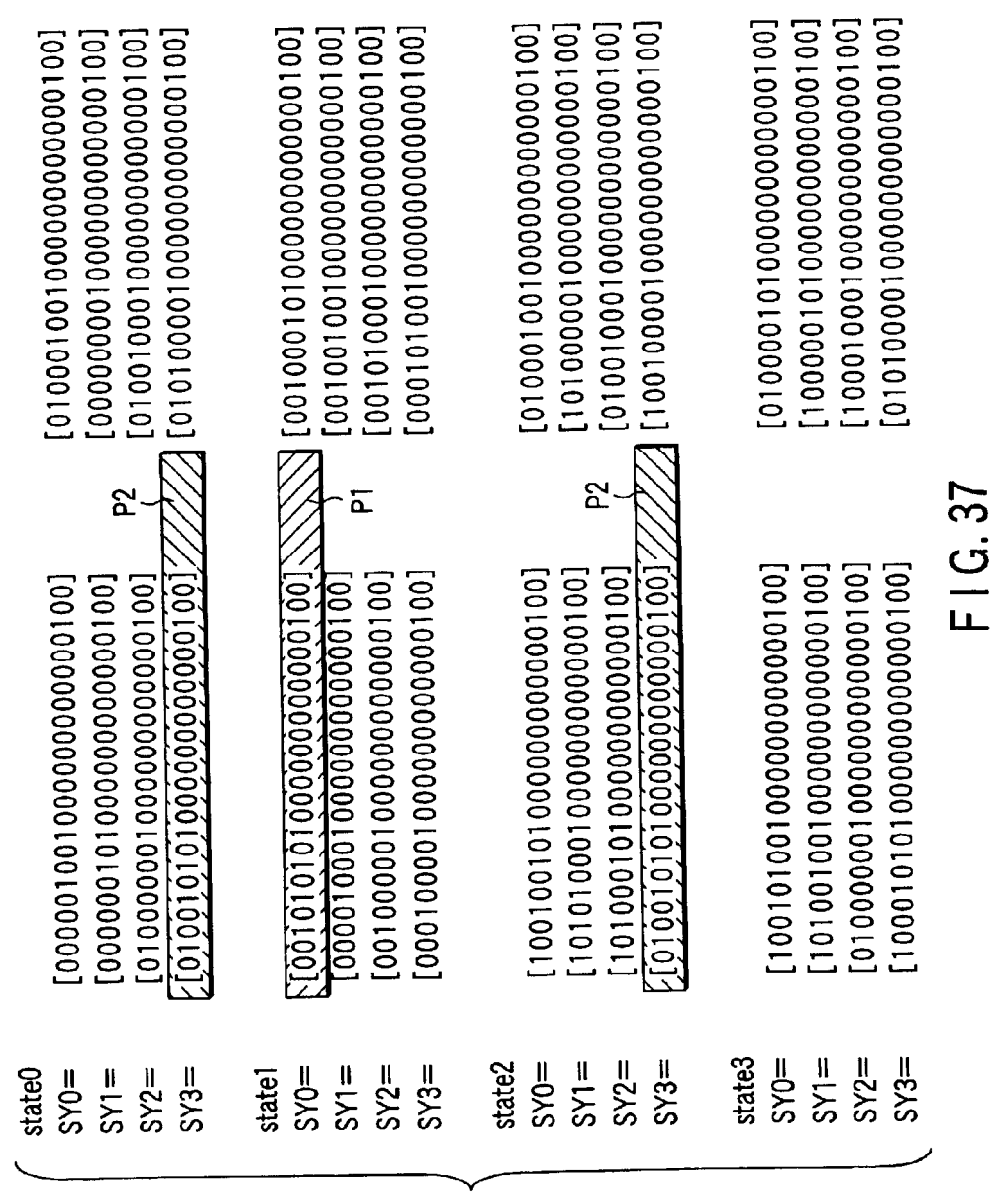

Pattern P1 shown in FIG. 37 does not conform to "condition γ", and pattern P2 does not conform to "condition β". All patterns shown in FIG. 36 meet "condition α".

FIGS. 22 and 36 show an identical pattern using different indication methods. The occupation ratio of patterns which meet "condition β" is 94%, and that of patterns which meet "condition γ" is 97%. In FIG. 36, a pattern which does not meet "condition γ" is indicated as pattern P1.

FIGS. 33 and 37 show an identical pattern using different indication methods. The occupation ratio of patterns which meet "condition β" is as high as 100%, and that of patterns which meet "condition γ" is as high as 96%. In FIG. 37, a pattern which does not meet "condition γ" is indicated as pattern P1, and a pattern which does not meet "condition β" is indicated as pattern P2.

An information storage medium on which the aforementioned SYNC code patterns are recorded, and an information recording/reproduction apparatus for recording the SYNC code patterns on an information storage medium, and reproducing the SYNC code patterns from the information storage medium will be described below.

Figure 1:
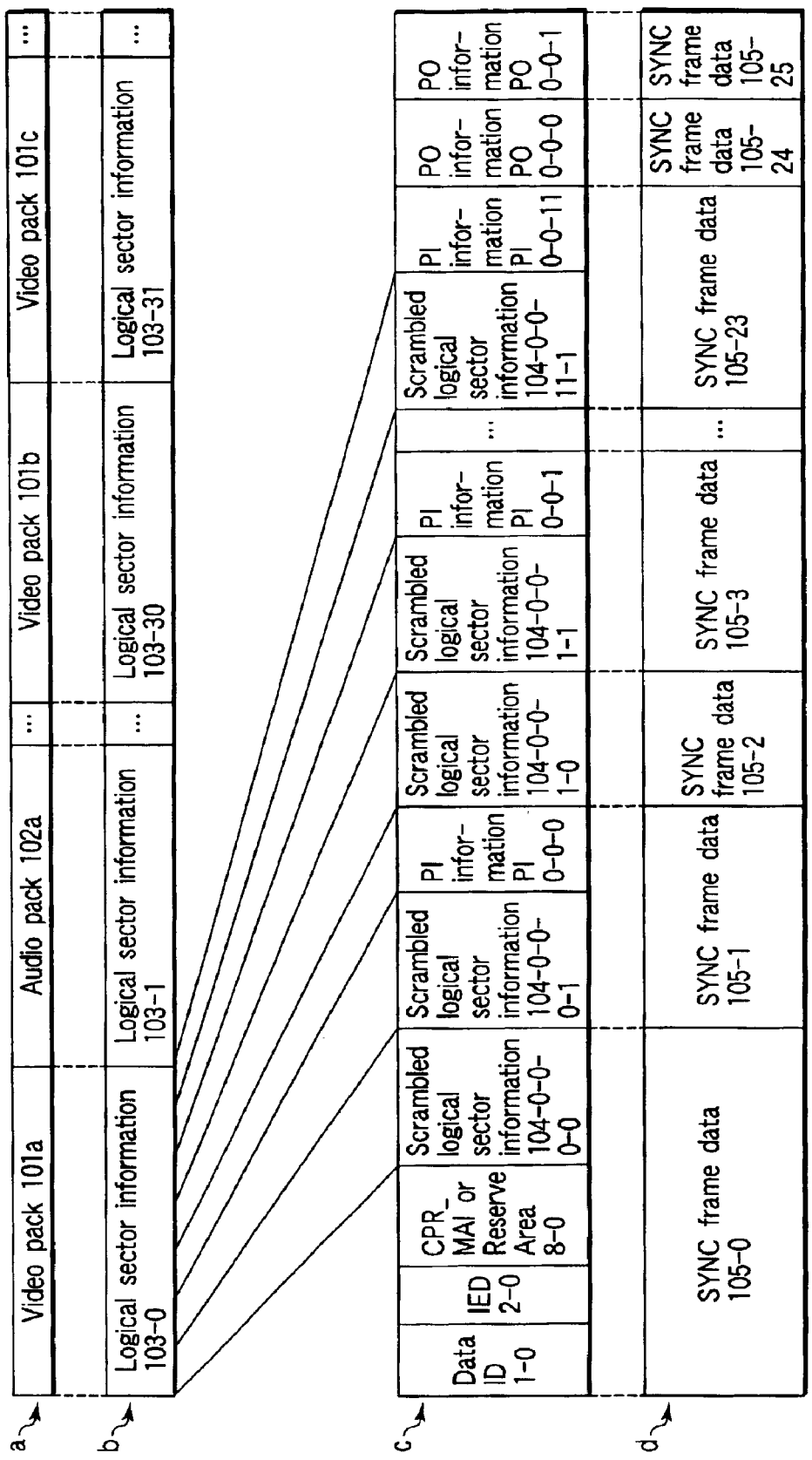
FIG. 1 shows an example of SYNC frame data to be stored in an information storage medium.
Figure 2:
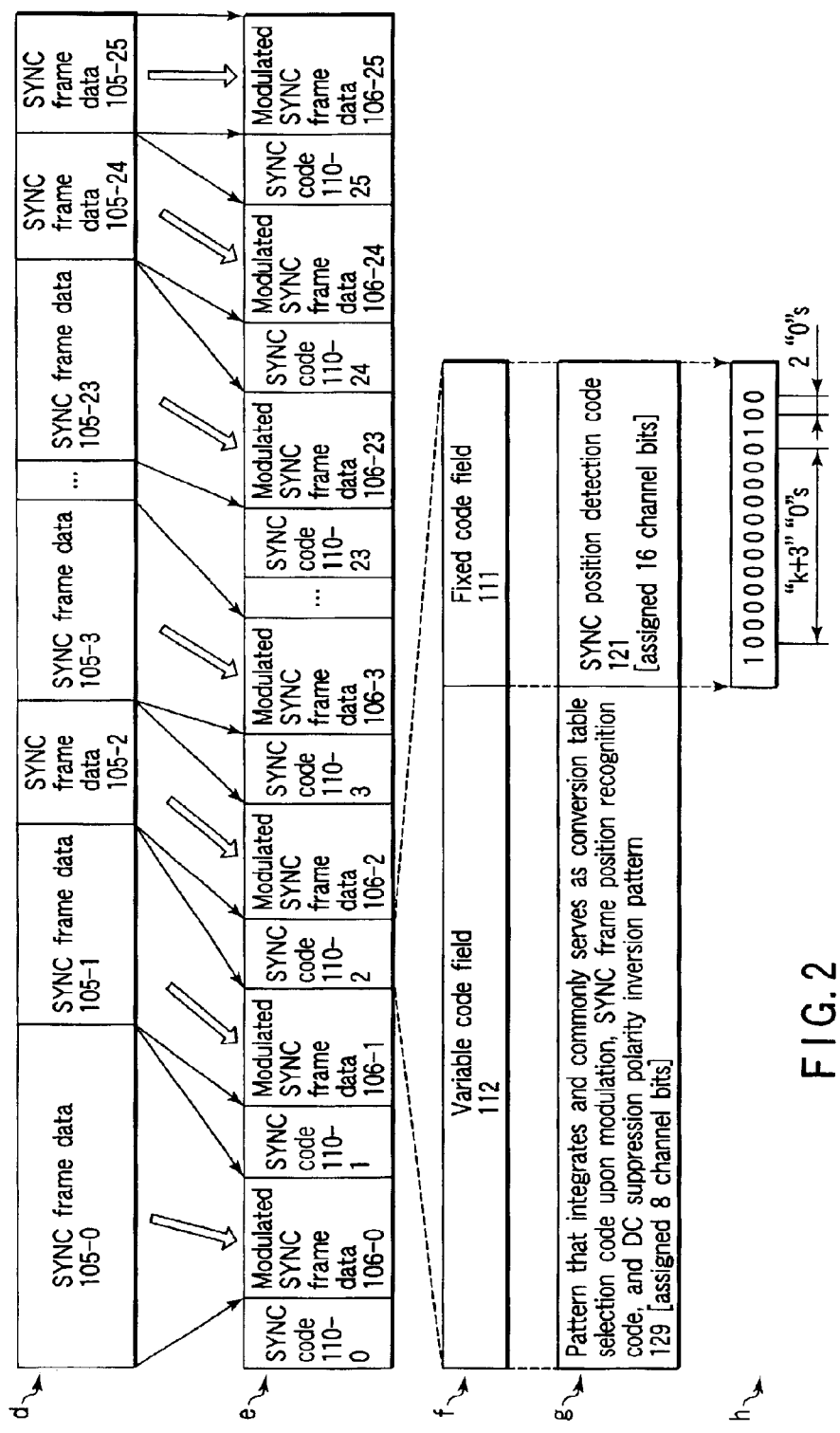
FIG. 2 shows an example of the data structure when a SYNC code is appended to the SYNC frame data, and that of the SYNC code.

FIGS. 1 and 2 are views for explaining the data structure recorded on an information storage medium of the present invention.

Portion a in FIG. 1 indicates a pack sequence which includes a video pack 101*a*, audio pack 102*a*, . . . , and portion b indicates logical sector information (103-0, 103-1, 103-2, . . . ) corresponding to each pack. Also, portion c indicates a state wherein one logical sector information 103-0 is scrambled, and PI information is appended to each row (each of 12 rows in this example). Furthermore, Data ID, IED, and CPR_MAI are appended to the first row. The last row (13th row) of this logical sector information stores PO information.

A sector block (for 13 rows) shown in portion c in FIG. 1 is segmented into SYNC frame data 105-0, 105-1, . . . (a total of 26 (13×2) data). A SYNC code (to be described later) is appended between neighboring SYNC frame data. That is, a SYNC code is appended to the head of each SYNC frame data.

FIG. 2 shows a state wherein SYNC codes are inserted between neighboring SYNC frame data, as indicated by portions of symbols d and f. Each SYNC code is made up of a variable code field 112 and fixed code field 111, as in portion f, and these fields have contents, as shown in portions indicated by symbols g and h in FIG. 2.

A characteristic arrangement will be explained below.

Video information is recorded on an information storage medium 9 in the form of 2048-byte video packs 101 and audio packs 102 (portion a), as shown in FIG. 1. This 2048-byte recording unit is handled as logical sector information 103 (portion b).

Figure 5:
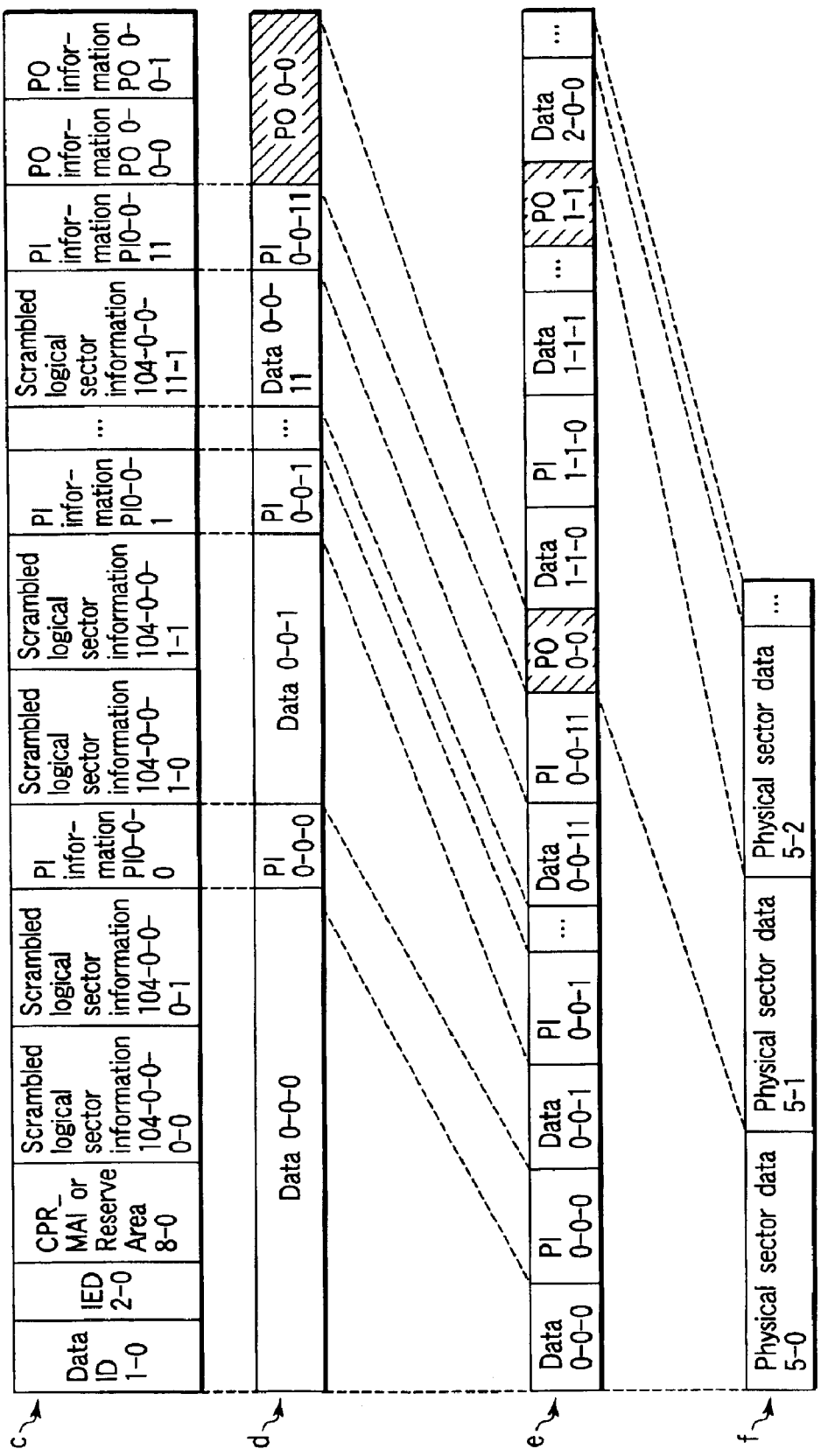
FIG. 5 shows an example of the data structure of physical sector data to be stored in an information storage medium.
Figure 6:
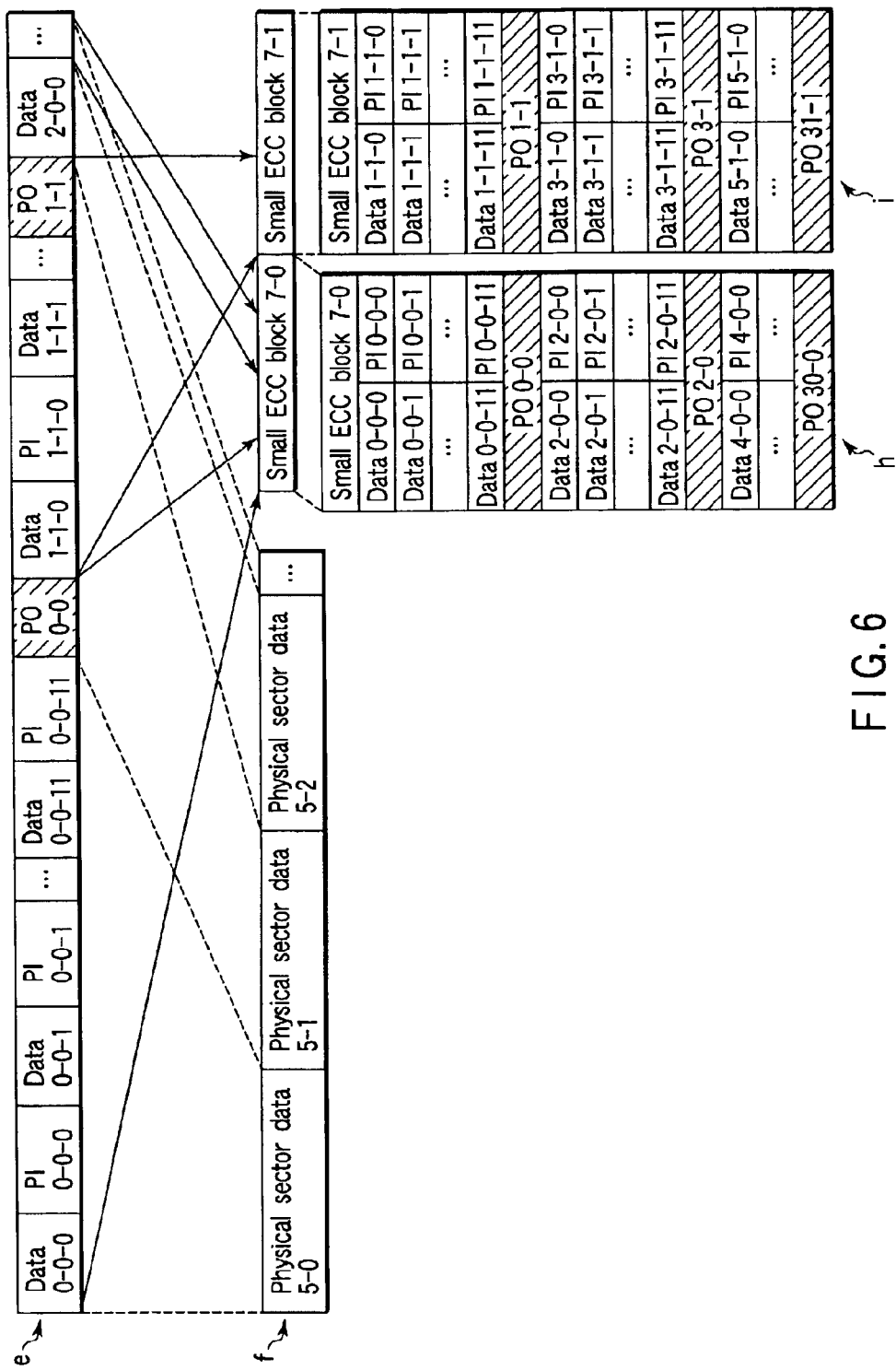
FIG. 6 shows an example of the relationship between physical sector data and ECC blocks.
Figure 7:
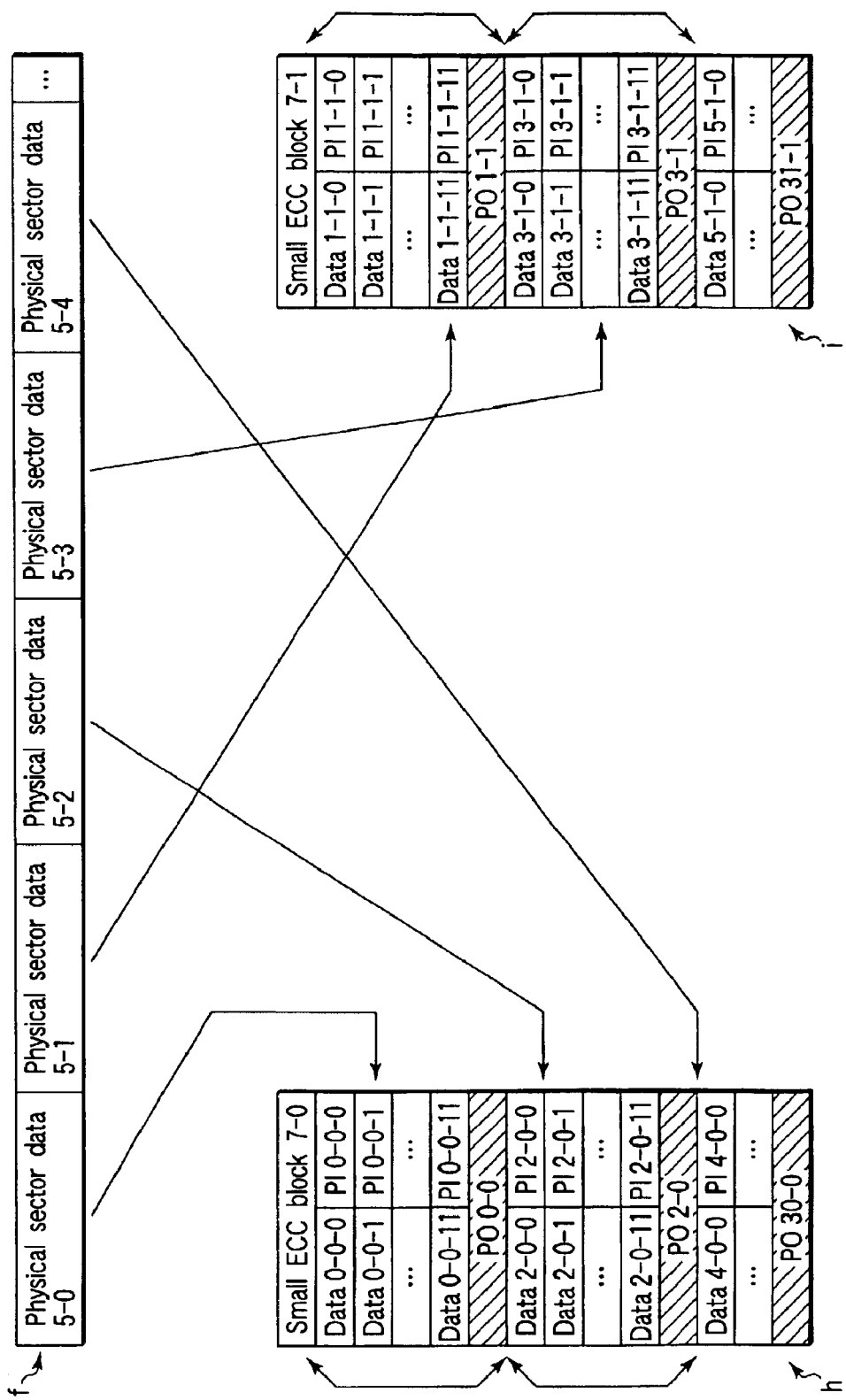
FIG. 7 shows an example of the relationship between physical sector data and ECC blocks.

In the existing DVD standard, data obtained by appending Data ID 1-0, IED 2-0, and CPR_MAI 18-0 to this data, and PI (Parity of Inner-code) information and PO (Parity of Outer-code) information corresponding to an ECC structure shown in FIGS. 5 to 7 is segmented to form 26 equal SYNC frame data 105-0 to 105-25 (portions of symbol d in FIGS. 1 and 2). In this case, PO information is also segmented into two equal data.

The respective SYNC frame data 105 are modulated, and SYNC codes 110 of the present invention are inserted between neighboring modulated SYNC frame data 106. A modulation method is generally expressed by (d, k; m, n), which symbols mean that "m-bit" source data is converted into "n-channel bits", and a modulated channel bit pattern has a minimum of "d" "0"s run length and a maximum of "k" "0"s run length. That is, the modulated channel bit patterns satisfy conditions that a minimum of "d" pieces of "0"s successively arranged and a maximum of "k" pieces of "0"s successively arranged.

An embodiment of the present invention adopts a modulation method described in, e.g., "Jpn. Pat. Appln. KOKAI Publication No. 2000-332613". In this modulation method, $d=1, k=9, m=4, n=6$ Each SYNC code 110 is segmented into a fixed code field 111 and variable code field 112, and has a structure in which a "pattern 129 which integrally serves as a conversion table selection code upon modulation, SYNC frame position identification code, and DC suppression polarity inversion pattern" is allocated in the variable code field 112, and a SYNC position detection code 121 is allocated in the fixed code field 111. In the following description, reference numerals are assigned to these codes and pattern to refer to them as a conversion table selection code 122 upon modulation, SYNC frame position identification code 123, and DC suppression polarity inversion pattern 124, processes of which will be described independently. However, since these codes and pattern are integrally allocated in the variable code field 112, they are processed together.

Note that modulation herein means conversion of input data into modulated data according to the aforementioned modulation rule. In this case, this conversion process adopts a method of selecting modulated data corresponding to input data from a large number of modulated data stored in conversion tables. Therefore, information indicating a table used to convert into modulated data upon modulation is necessary, and this information is the "conversion table selection code 122 upon modulation", which represents a conversion table used to generate the next modulated data to that immediately after a SYNC code.

The "SYNC frame position identification code 123" is used to identify the frame position of the SYNC frame in a physical sector. A frame can be identified by the layout pattern of a plurality of SYNC frame position identification codes before and after the frame of interest.

A large characteristic feature of the present invention lies in that the practical contents of the SYNC position detection code 121 are formed by a combination of a pattern in which "k+3" "0"s run, and a pattern in which two "0"s run, as shown in portion h in FIG. 2. In order to facilitate position detection of each SYNC code 110, a code which never exists in the modulated SYNC frame data 106 is allocated in the SYNC position detection cod 121.

Since the modulated SYNC frame data 106 has been modulated according to the (d, k; m, n) modulation rule, "k+1" "0"s never run in the modulated data. Therefore, it is desirable to allocate a pattern in which "k+1" or more "0"s run as a pattern in the SYNC position detection code 121.

However, when the pattern in which "k+1" "0"s run is allocated as the pattern in the SYNC position detection code 121, if a plurality of bit shift errors occur upon reproducing modulated SYNC frame data 106, such errors may be erroneously detected as the SYNC position detection code 121. Therefore, a pattern in which "k+2" or more "0"s run is preferably allocated as a pattern in the SYNC position detection code 121. However, if the "0" run pattern is too long, a phase error readily occurs in a PLL circuit 174.

The existing DVD adopts a pattern in which "k+3" "0"s run (the modulation rule of the existing DVD is (2, 10; 8, 16)). Therefore, in order to suppress generation of bit shift errors and to assure reliability of the position detection of the SYNC code 110 and information reproduction compared to the existing DVD, the run length of "0"s must be set to be "k+3" or less.

As described in "Jpn. Pat. Publication No. 10-275358", a DSV (Digital Sum Value) value changes depending on a modulated bit pattern. If the DSV value largely deviates from 0, it can approach 0 by changing a bit from "0" to "1" at an optimal bit pattern position.

In this way, in the present invention, the SYNC code 110 includes a DC suppression polarity inversion pattern 124 having a specific pattern which makes the DSV value approach 0.

When the modulation method described in "Jpn. Pat. Appln. KOKAI Publication No. 2000-332613" is adopted, 6 channel bits to be demodulated must be modulated also using "selection information of a conversion table used upon modulation of 6-channel bit modulated data", which is present immediately after 6-channel bit modulated data to be demodulated.

Therefore, as shown in portion e in FIG. 2, selection information of a conversion table for 6 channel bits which should appear after the last 6-channel bit data of the modulated SYNC frame data 106 allocated immediately before the SYNC code 110 is recorded in the conversion table selection code 122 upon modulation in the SYNC code 110. That is, the SYNC code 110 includes the conversion table selection code 122 upon modulation. This conversion table selection code 122 upon modulation is conversion table selection information for 6-channel bit data which should appear after the last 6-channel bit data of the immediately preceding SYNC frame data 106. By looking up this conversion table data, a conversion table to be used upon demodulating the next data can be determined.

FIGS. 3 and 4 show the structure of an information recording/reproduction apparatus according to the present invention.

FIG. 3 shows a recording system, and FIG. 4 shows a reproduction system. A controller 143 controls the overall apparatus. A Data ID, IED, CPR_MAI, EDC appending unit 168 appends Data ID, IED, CPR_MAI, and EDC to logical sector information 103 input from an interface 142. The Data ID is generated by a Data ID generator 165 on the basis of a predetermined rule. The CPR_MAI is output from a CPR_MAI generator 167. The logical sector information 103 appended with the Data ID, IED, CPR_MAI, and EDC is input to a scramble circuit 157, and the entire data is scrambled. The scrambled data is input to an ECC encoding circuit 161, and is converted into ECC blocks. The ECC blocks are shown in portions indicated by symbols h and i in FIG. 6.

The ECC blocks are input to a modulation circuit 151 and are modulated. This modulation process uses a conversion table in a conversion table memory 153 (e.g., a conversion table from 4 bits into 6 bits). Upon selecting modulated data from a table, a DSV calculator 148 calculates a DSV of continuous modulated data, and modulated data is selected so that DC components fall within a predetermined level range (0 or 1 run length falls within a predetermined value range). A DC suppression polarity inversion pattern is selected in accordance with the DSV calculation result. A SYNC frame position identification code generator 136 outputs a SYNC frame position identification code. The SYNC frame position identification code is used to identify a frame in one ECC block.

The modulated data (SYNC frame data) and modulation related information (SYNC code: the conversion table selection code, the SYNC frame position identification code, information used to select the DC suppression polarity inversion pattern, and the like) are stored in a temporary memory 150, and are then supplied to a SYNC code generating/appending unit 146. The SYNC code generating/appending unit 146 appends a code shown in portion h in FIG. 2 in the SYNC code. That is, the SYNC code generating/appending unit 146 generates and appends a SYNC code pattern as the aforementioned characteristic feature of the present invention.

Figure 9:
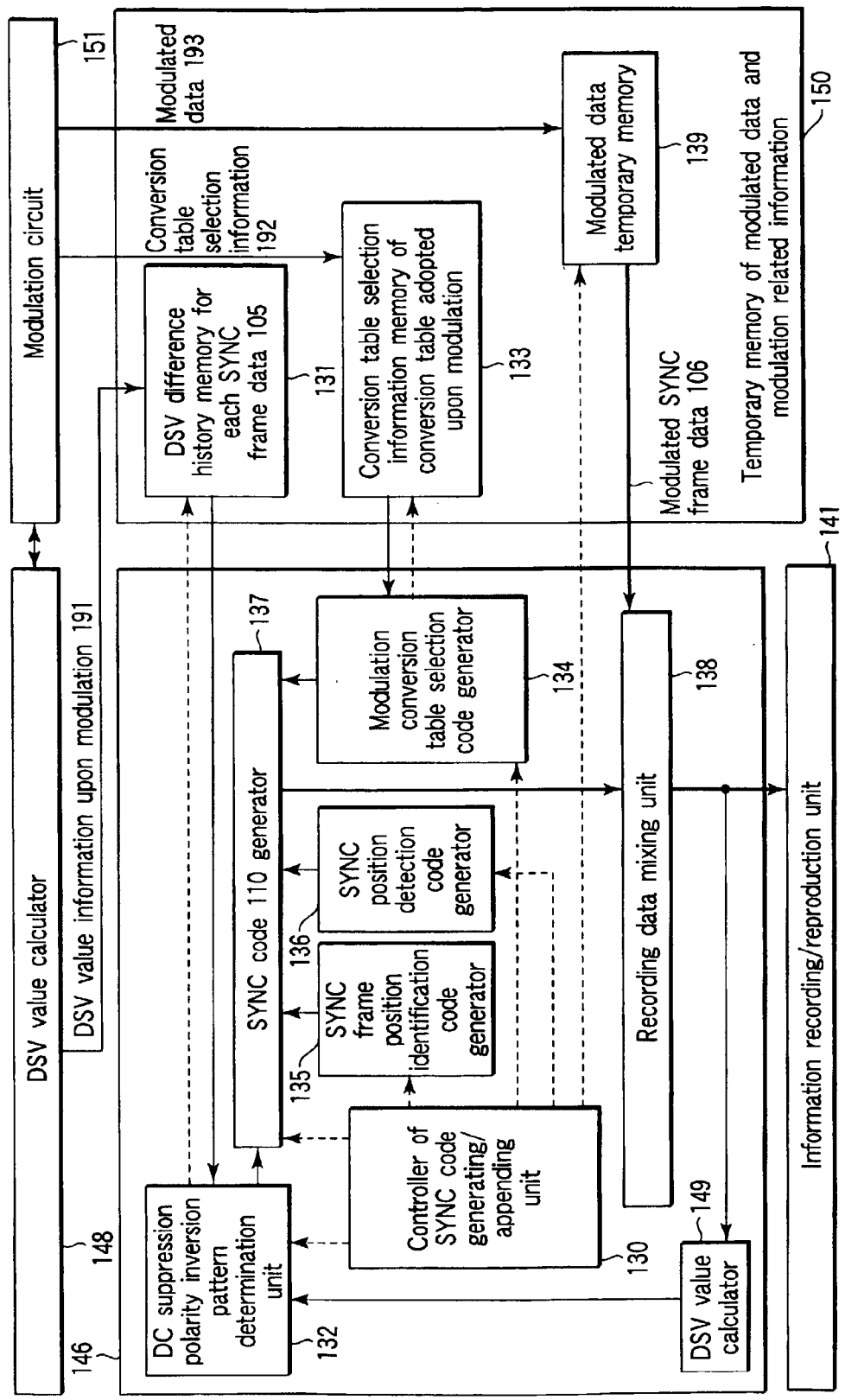
FIG. 9 is a block diagram showing the structure of a SYNC code generating/appending unit of the information recording/reproduction apparatus according to an embodiment of the present invention.

The detailed contents of the temporary memory 150 of modulated data and modulation related information, and the SYNC code generating/appending unit 146 are shown in FIG. 9 (to be described later).

The data converted into SYNC frames are supplied to an information recording/reproducing unit 141, and are recorded on an optical disk.

Data reproduced from the optical disk undergoes waveform equalization from the information recording/reproducing unit 141 to a PR equalization circuit 130, and is then converted into digital data by an A/D converter 169. The digital data is input to a code position extractor 145 and shift register circuit 170 via a Viterbi decoder 156. Modulated data in the shift register circuit 170 is input to a demodulation circuit 152 in accordance with the SYNC position extraction result of the code position extractor 145, and is demodulated using a conversion table in a demodulation conversion table memory 154 (e.g., a conversion table from 6 bits into 4 bits). From the demodulated data, a Data ID field & IED field extractor 171 extracts Data ID and IED. The Data ID undergoes error checking by a Data ID field error checker 172 using the IED. If no error is found, it is determined that ECC blocks are normally reproduced. If any error is found, for example, ECC blocks are read again.

ECC blocks are input to an ECC decoding circuit 162 to undergo an error correction process. The error-corrected data are descrambled by a descramble circuit 159 to obtain original logical sector information, which is extracted by a logical sector extractor 173. The extracted logical sector is sent to a data decode processor (not shown) via the interface 142.

FIGS. 5, 6, and 7 show processes in which ECC blocks are formed based on the data sequence shown in portion c in FIG. 1. Portion d in FIG. 5 describes respective rows of an ECC block as data 0-0-0, 0-0-1, 0-0-2, .... Physical sector data forms 13 rows of frames. PI information is appended to each row of this physical sector, and the last row corresponds to that of PO information. One ECC block is formed by a plurality of physical sector data. PO information is generated for each ECC block formed by a plurality of physical sectors, and is distributed to every rows of physical sectors.

As shown in FIG. 7, every other physical sector data are selected and are distributed to first and second small ECC blocks 7-0 and 7-1.

In this example, one of physical sector data (portion f) consists of 13 rows. One of these rows is a portion of PO information. One small ECC block is formed by 31 physical sector data. Sixty-two physical sector data (two small ECC blocks) are divided into, e.g., even and odd sector data, thus generating PO information for each of a block formed by the even sector data, and that defined formed by the odd sector data.

FIG. 7 shows allocation of physical sector data and the relationship between the physical sector data, which are allocated in this way, and ECC blocks. FIG. 8 shows a state wherein physical sector data are laid out on the information storage medium 9. First and second small ECC blocks are formed by fetching every other physical sector data allocated on a track. As shown in FIG. 8, the information storage medium 9 comprises a management area 9a and data area 9b. The management area 9a is used to store management information. The management area 9a is also called a lead-in or lead-out area, and is assured on, e.g., the innermost or outermost periphery of the information storage medium 9. The management information includes, e.g., defect management information or the like. On the other hand, the data area 9b is used to store predetermined data. The predetermined data includes, e.g., user data.

In the embodiment of the present invention, the channel bit interval is shortened nearly to the limit by aiming at a higher recording density of the information storage medium 9. As a result, when a pattern "10101010101010101010101010" as repetition of a pattern of d=1 is recorded on the information storage medium 9, and that data is reproduced by the information recording/reproducing unit 141, it is close to the cutoff frequency of MTF characteristics of a reproduction optical system. For this reason, most of the signal amplitude of a reproduced signal is buried in noise.

As a method of reproducing recording marks or pits, the spacings of which are shortened nearly to the limit (cutoff frequency) of the MTF characteristics to attain a higher density, the embodiment of the present invention adopts a PRML technique. That is, a signal reproduced from the information recording/reproducing unit 141 undergoes reproduction waveform correction by the PR equalization circuit 130. The A/D (analog-to-digital) converter 169 samples the signals that has passed through the PR equalization circuit 130 in synchronism with the timing of a reference clock 198 sent from a reference clock generation circuit 160, thus converting the signal into digital data, and the digital data undergoes a Viterbi decoding process in the Viterbi decoder 156.

The data that has undergone the Viterbi decoding process is processed in the same manner as conventional data which has been binarized based on a slice level. Upon adopting the PRML technique, if the sampling timing of the A/D converter 169 deviates, the error rate of data after Viterbi decoding increases. Hence, in order to improve the precision of the sampling timing, the information reproduction apparatus or information recording/reproduction apparatus of the present invention independently has a special sampling timing extraction circuit (a combination of the Schmitt trigger binarization circuit 155 and the PLL circuit 174).

The information reproduction apparatus or information recording/reproduction apparatus of the present invention is characterized in that the Schmitt trigger binarization circuit 155 is used as a binarization circuit. This Schmitt trigger binarization circuit 155 has characteristics in that a specific width (in practice, a forward voltage value of a diode) is provided to a binarization slice reference level, and binarization is one only when that specific width has been exceeded. Therefore, when the aforementioned pattern "10101010101010101010101010" is input, since the signal amplitude is very small, no binarization switching takes place. When a pattern coarser than this pattern, e.g., "100100100100100100100100" is input, the amplitude of a reproduced signal increases. Therefore, polarity switching of an output binary signal occurs in synchronism with the timing of "1" in the Schmitt trigger binarization circuit 155. The embodiment of the present invention adopts the NRZI (Non Return to Zero Invert) method, and the "1" positions of the pattern match the edges (boundaries) of the recording marks or pits.

The PLL circuit 174 detects frequency and phase errors between a binary signal as the output from the Schmitt trigger binarization circuit 155, and the reference clock signal 198 sent from the reference clock generation circuit 160, and changes the frequency and phase of its output clock. The reference clock generation circuit 160 feeds back (the frequency and phase of) the reference clock 198 to reduce the error rate after Viterbi decoding using the output signal from the PLL circuit 174, and decoding characteristic information of the Viterbi decoder 156 (more specifically, information of the convergence length (distance required until convergence) in a path metric memory (not shown) in the Viterbi decoder 156).

The ECC encoding circuit 161, ECC decoding circuit 162, scramble circuit 157, and descramble circuit 159 in FIG. 2 execute 1-byte processes. If 1-byte data before modulation is modulated according to the (d, k; m, n) modulation rule, the length after modulation is given by:

$$8n/m \qquad (11)$$

Therefore, when the data processing unit in each of the above circuits is converted into a processing unit after modulation, it is given by formula (11). Since the processing unit of the modulated SYNC frame data 106 in portion e in FIG. 2 is given by formula (11), the data size (channel bit size) of the SYNC code 110 must be set to be an integer multiple of formula (11) for the purpose of achieving integration of processes between the SYNC code 110 and modulated SYNC frame data 106 shown in portion e in FIG. 2. Therefore, a large characteristic feature of the present invention lies in that integration of processes between the SYNC code 110 and modulated SYNC frame data 106 is assured by setting the size of the SYNC code 110 in the embodiment of the present invention by:

$$8Nn/m \qquad (12)$$

where N is an integer value.

As an embodiment of the present invention, since an explanation has been given so far under the condition that
$d=1$, $k=9$, $m=4$, $n=6$ if these values are substituted in formula (12), the total data size of the SYNC code 110 is:

$$12N \qquad (13)$$

FIG. 9 shows details of a block (SYNC code generating/appending unit 146) for generating a SYNC code 110 according to the present invention, and for appending this SYNC code to a SYNC frame to generate a data unit to be recorded, and the temporary memory 150 of modulated data and modulation related information. The operations of these blocks will be described later with reference to the flow chart.

Figure 10:
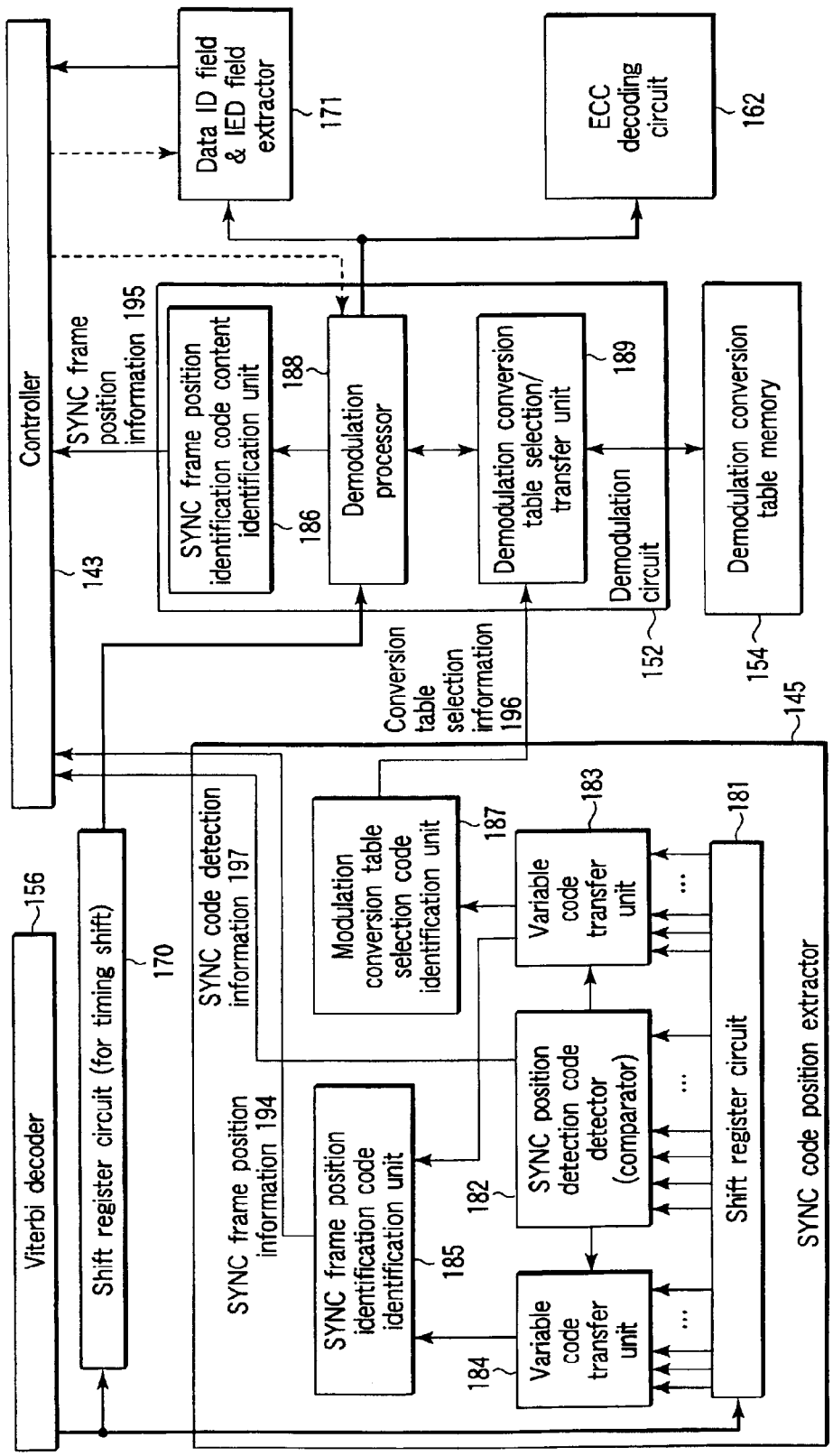
FIG. 10 is a block diagram showing the structure around a SYNC code position detecting unit of the information recording/reproduction apparatus according to an embodiment of the present invention.

FIG. 10 shows details of the code position extractor 145 and demodulation circuit 152. The operations of these blocks will be described later with reference to the flow chart.

FIGS. 11 to 21 show the structure in a SYNC code in the present invention.

Figure 11:
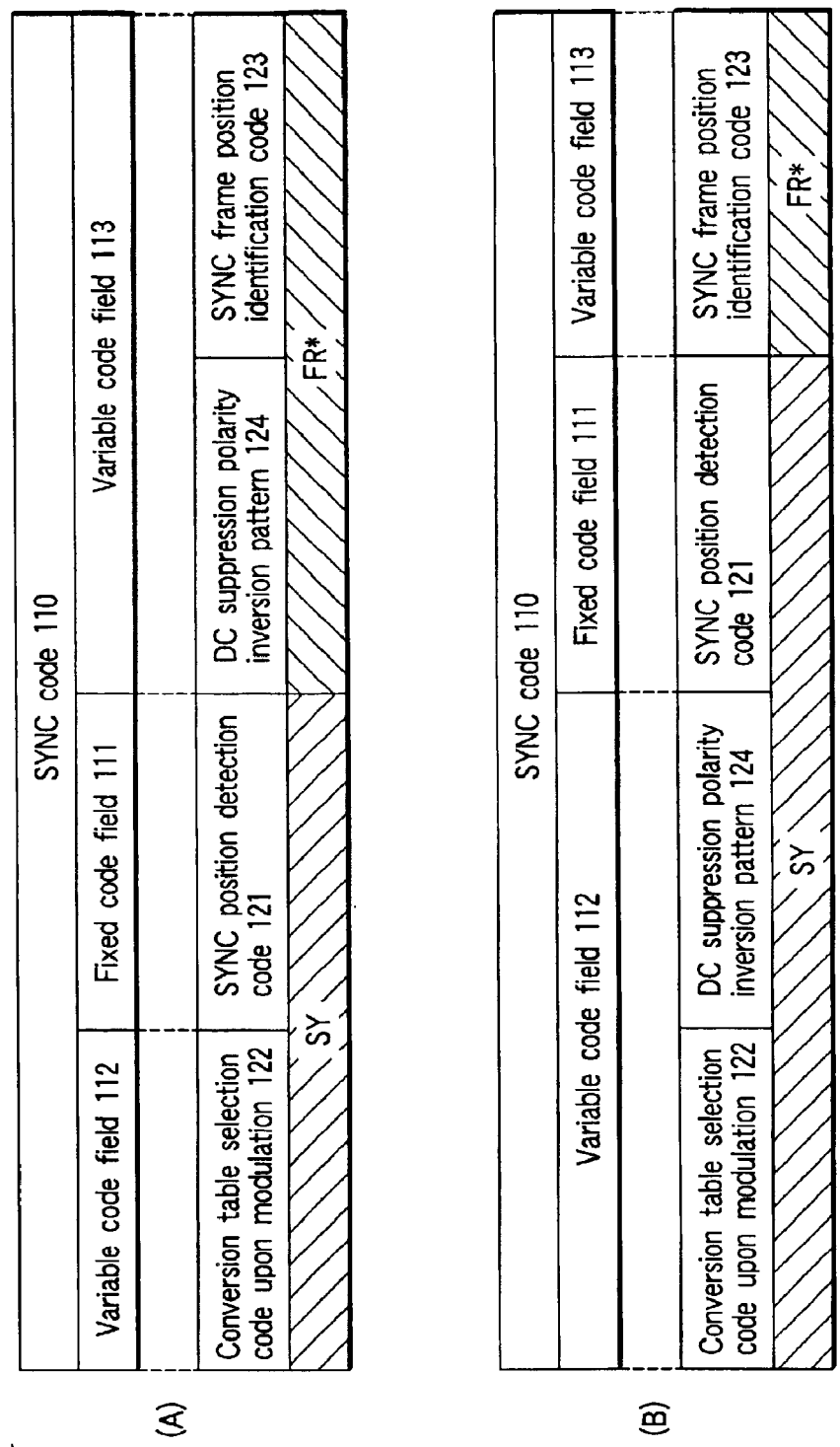
FIG. 11 shows the first example of the data structure of a SYNC code.

In a SYNC code 110 of an embodiment shown in portion (A) in FIG. 11, a conversion table selection code 122 upon modulation and SYNC position detection code 121 are allocated as SYNC information (SY), and a DC suppression polarity inversion pattern 124 and SYNC frame position identification code 123 are allocated in turn as frame information (FR).

In a SYNC code 110 of an embodiment shown in portion (B) in FIG. 11, a conversion table selection code 122 upon modulation, DC suppression polarity inversion pattern 124, and SYNC position detection code 121 are allocated as SYNC information (SY), and a SYNC frame position identification code 123 is allocated as frame information (FR).

In a SYNC code 110 of an embodiment shown in portion (A) in FIG. 12, a conversion table selection code 122 upon modulation and SYNC frame position identification code 123 are allocated in turn as frame information (FR), and a SYNC position detection code 121 and DC suppression polarity inversion pattern 124 are allocated in turn as SYNC information (SY).

In a SYNC code 110 of an embodiment shown in portion (B) in FIG. 12, a conversion table selection code 122 upon modulation, DC suppression polarity inversion pattern 124, and SYNC frame position identification code 123 are allocated in turn as frame information (FR), and a SYNC position detection code 121 is allocated as SYNC information (SY).

In a SYNC code 110 of an embodiment shown in portion (C) in FIG. 12, a conversion table selection code 122 upon modulation, SYNC frame position identification code 123, DC suppression polarity inversion pattern 124, and SYNC frame position identification code 123 are allocated in turn as frame information (FR), and a SYNC position detection code 121 is allocated as SYNC information (SY).

Figure 13:
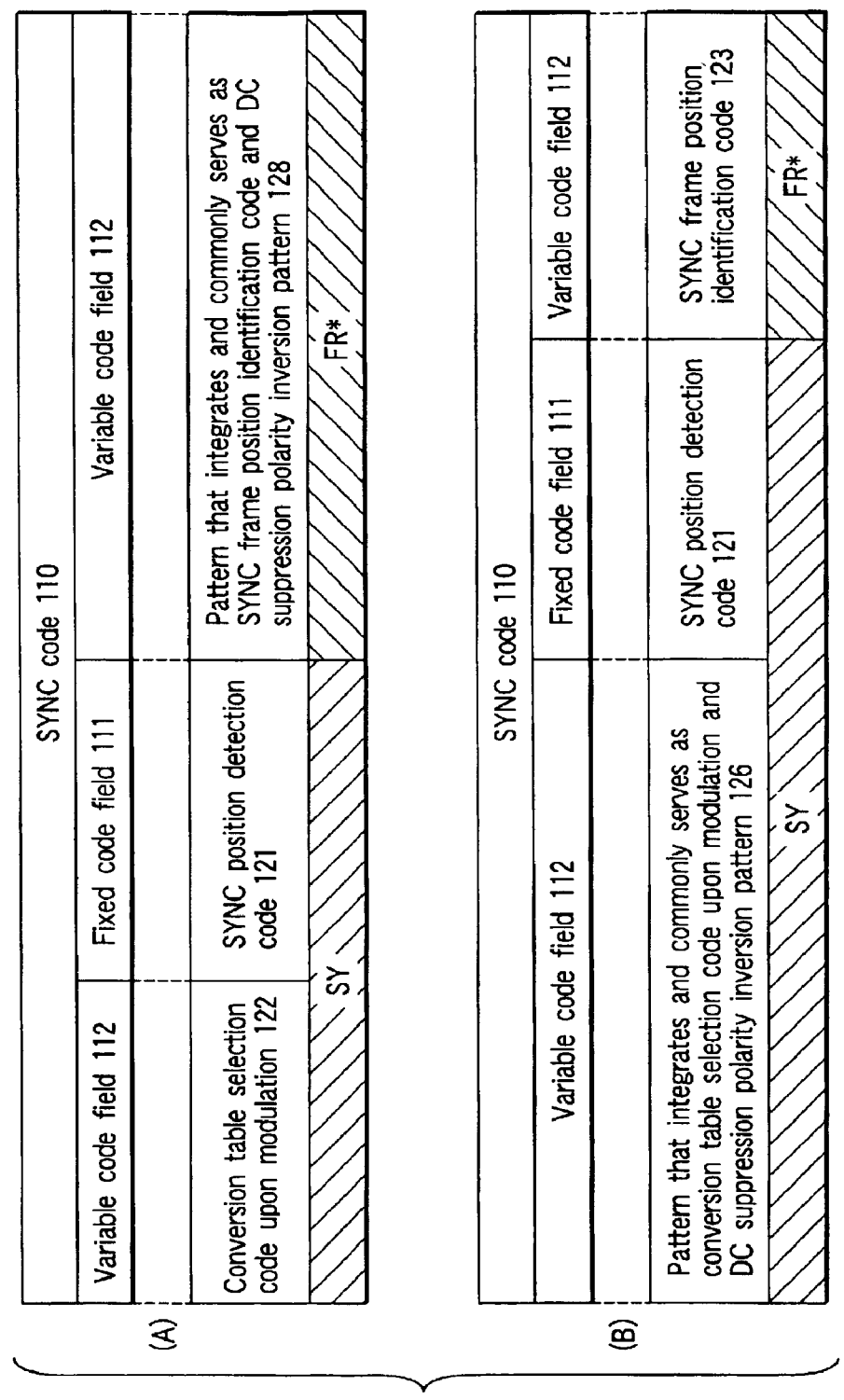
FIG. 13 shows the third example of the data structure of a SYNC code.

In a SYNC code 110 of an embodiment shown in portion (A) in FIG. 13, a conversion table selection code 122 upon modulation and SYNC position detection code 121 are allocated as SYNC information (SY), and a pattern that integrates a SYNC frame position identification code 123 and DC suppression polarity inversion pattern 124 is allocated as frame information (FR).

In a SYNC code 110 of an embodiment shown in portion (B) in FIG. 13, a pattern that integrates a conversion table selection code 122 upon modulation and DC suppression polarity inversion pattern 124, and a SYNC position detection code 121 are allocated as SYNC information (SY), and a SYNC frame position identification code 123 is allocated as frame information (FR).

Figure 14:
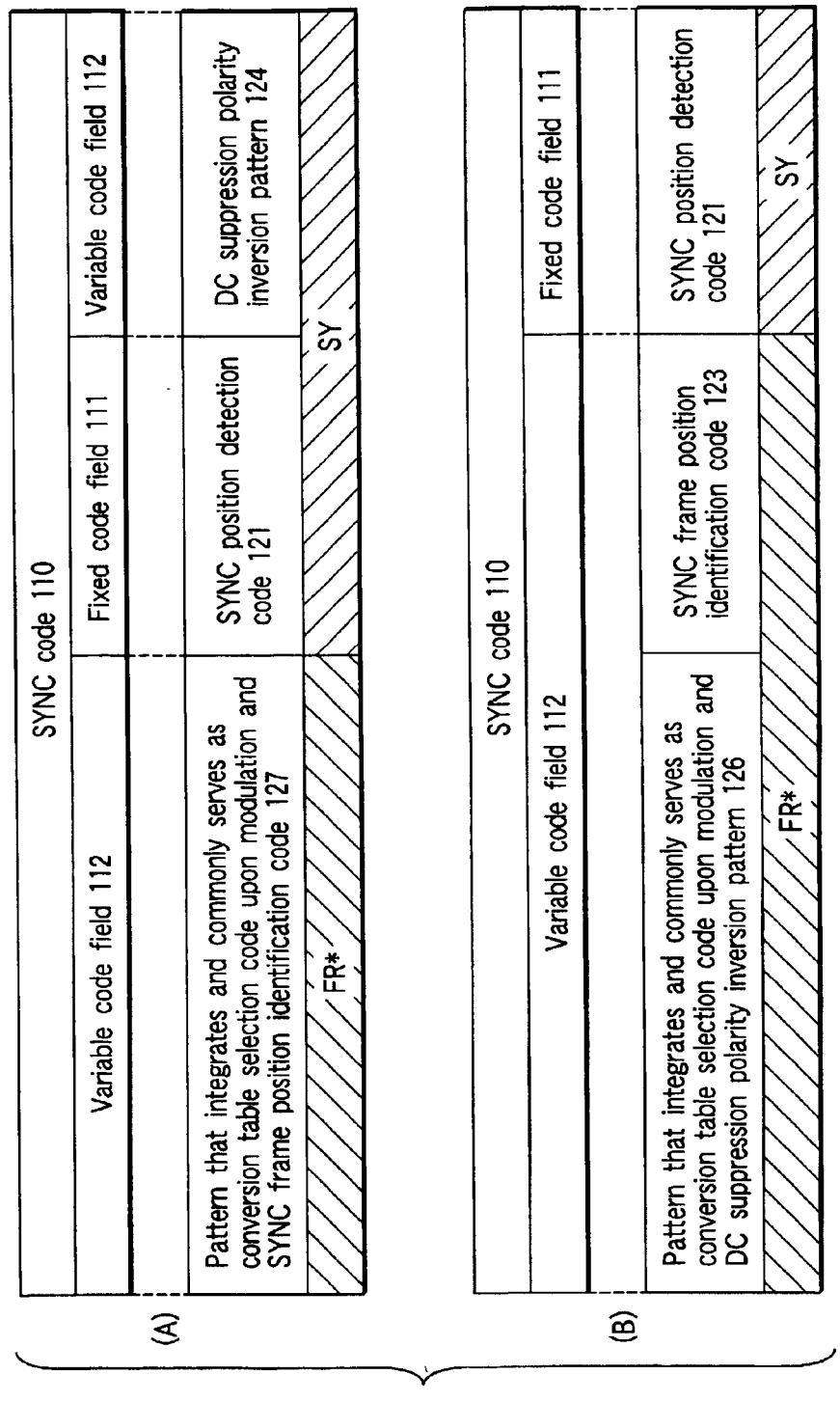
FIG. 14 shows the fourth example of the data structure of a SYNC code.

In a SYNC code 110 of an embodiment shown in portion (A) in FIG. 14, a pattern that integrates a conversion table selection code 122 upon modulation and SYNC frame position identification code 123 is allocated as frame information (FR), and SYNC position detection code 121 and DC suppression polarity inversion pattern 124 are allocated as SYNC information (SY).

In a SYNC code 110 of an embodiment shown in portion (B) in FIG. 14, a pattern that integrates a conversion table selection code 122 upon modulation and DC suppression polarity inversion pattern 124, and a SYNC frame position identification code 123 are allocated as frame information (FR), and a SYNC position detection code 121 is allocated as SYNC information (SY).

Figure 15:
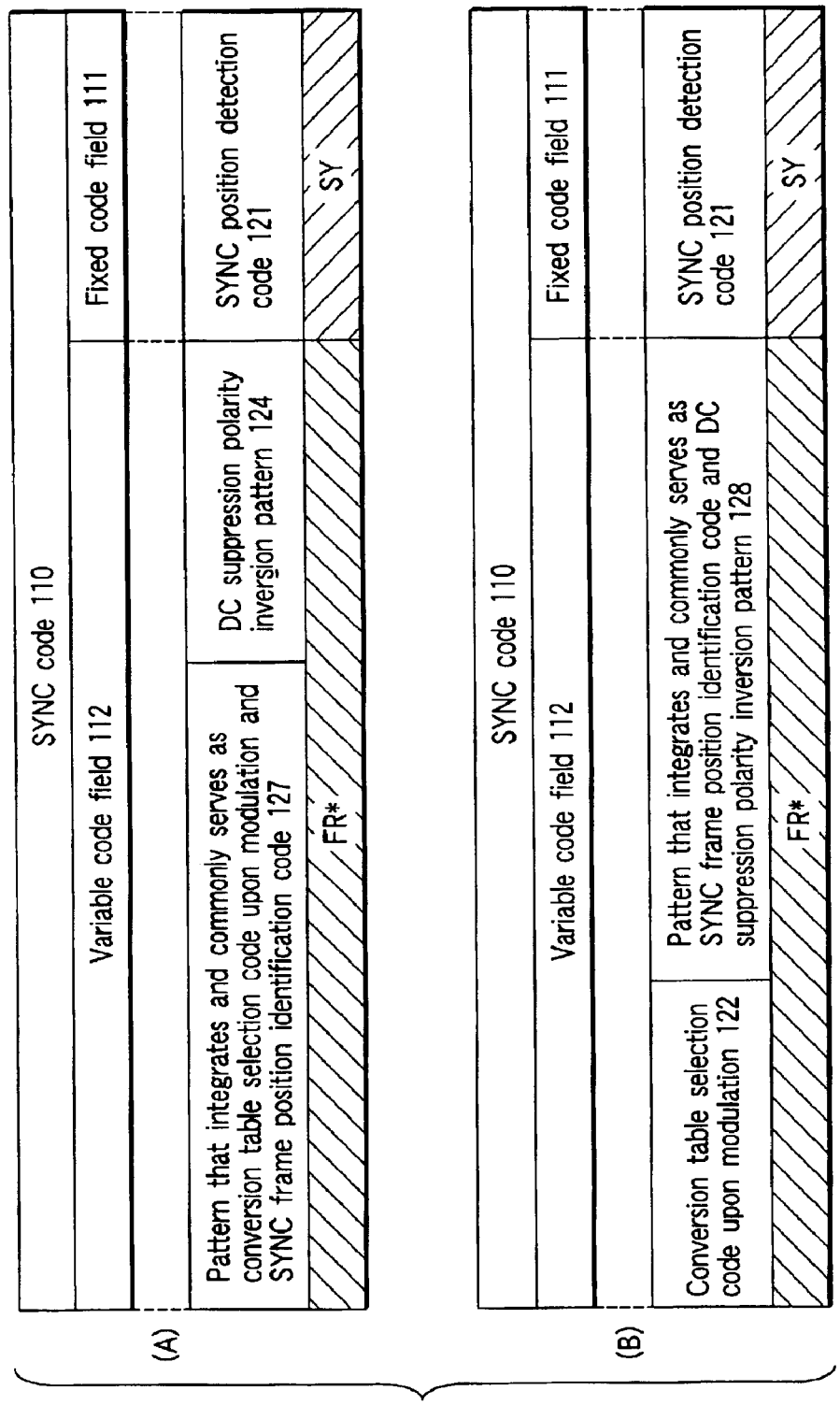
FIG. 15 shows the fifth example of the data structure of a SYNC code.

In a SYNC code 110 of an embodiment shown in portion (A) in FIG. 15, a pattern that integrates a conversion table selection code 122 upon modulation and SYNC frame position identification code 123, and DC suppression polarity inversion pattern 124 are allocated as frame information (FR), and a SYNC position detection code 121 is allocated as SYNC information (SY).

In a SYNC code 110 of an embodiment shown in portion (B) in FIG. 15, a conversion table selection code 122 upon modulation and a pattern that integrates a SYNC frame position identification code 123 and DC suppression polarity inversion pattern 124 are allocated in turn as frame information (FR), and a SYNC position detection code 121 is allocated as SYNC information (SY).

Figure 16:
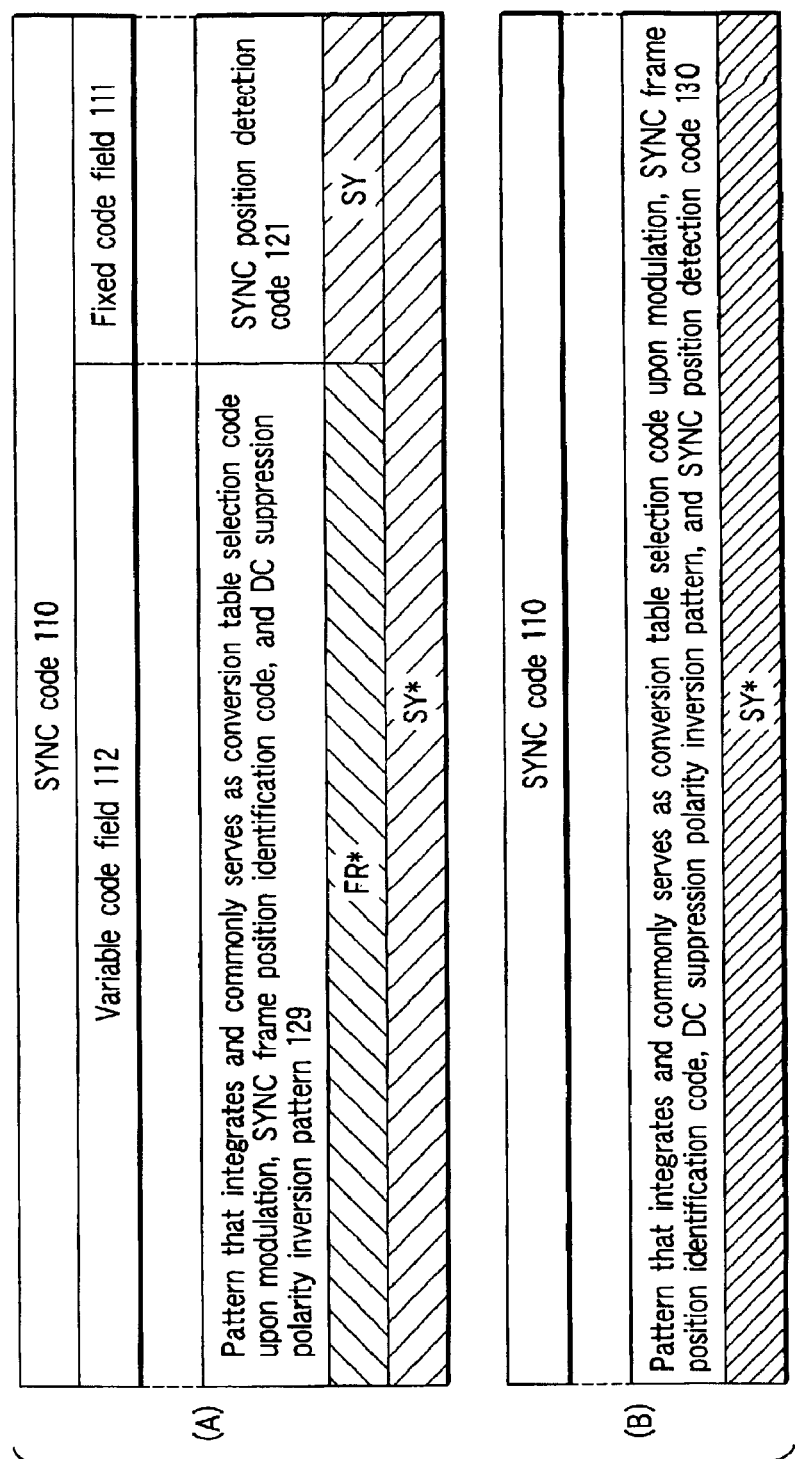
FIG. 16 shows the sixth example of the data structure of a SYNC code.

In a SYNC code 110 of an embodiment shown in portion (A) in FIG. 16, a pattern that integrates a conversion table selection code 122 upon modulation, SYNC frame position identification code 123, and DC suppression polarity inversion pattern 124 is allocated as frame information (FR), and a SYNC position detection code 121 is allocated as SYNC information (SY).

In a SYNC code 110 of an embodiment shown in portion (B) in FIG. 16, a pattern that integrates a conversion table selection code 122 upon modulation, SYNC frame position identification code 123, DC suppression polarity inversion pattern 124, and SYNC position detection code 121 is allocated as SYNC information (SY).

Figure 17:
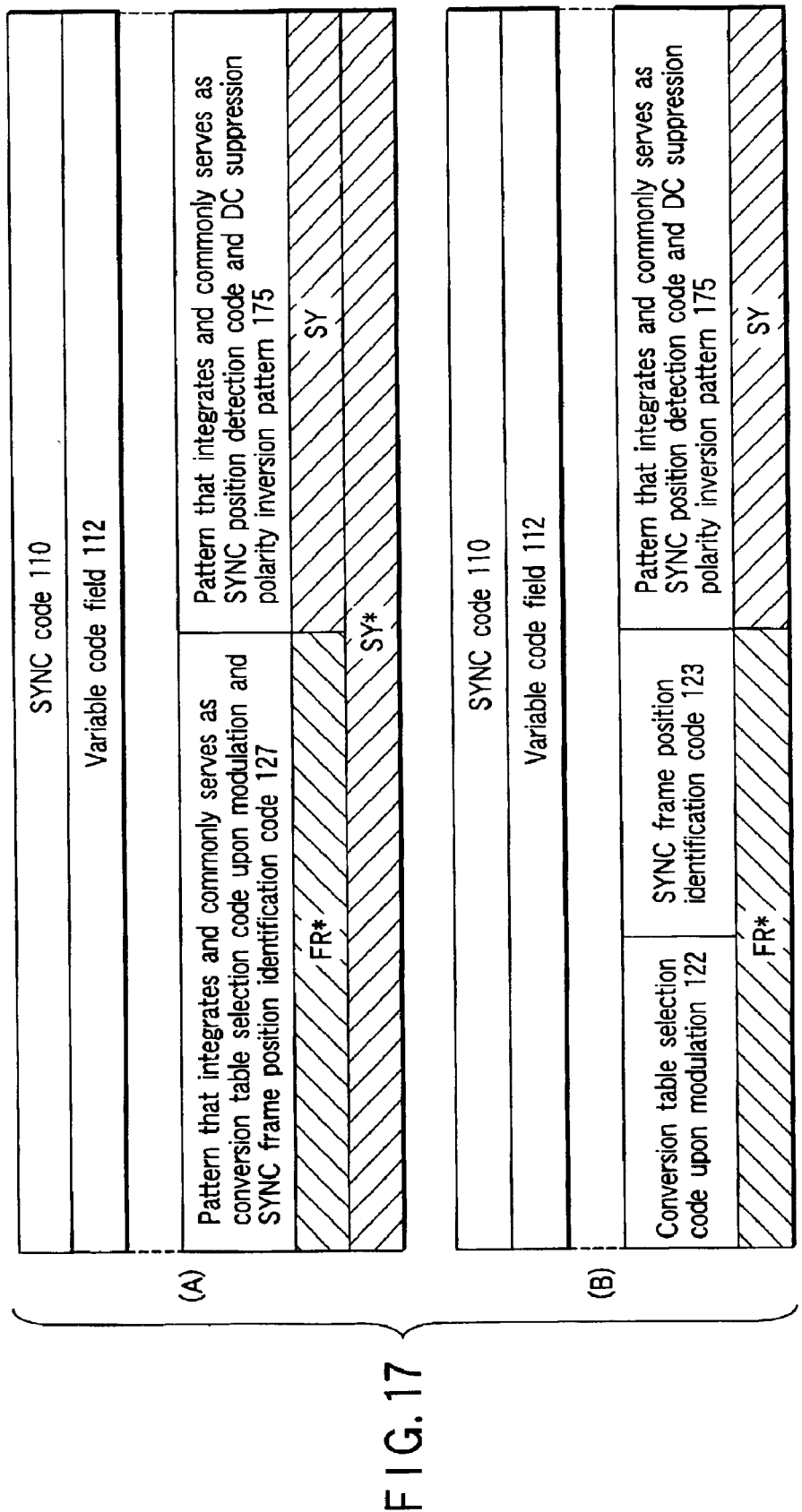
FIG. 17 shows the seventh example of the data structure of a SYNC code.

In a SYNC code 110 of an embodiment shown in portion (A) in FIG. 17, a pattern that integrates a conversion table selection code 122 upon modulation and SYNC frame position identification code 123 is allocated as frame information (FR), and a pattern that integrates a SYNC position detection code 121 and DC suppression polarity inversion pattern 124 is allocated as SYNC information (SY).

In a SYNC code 110 of an embodiment shown in portion (B) in FIG. 17, a conversion table selection code 122 upon modulation and SYNC frame position identification code 123 are allocated as frame information (FR), and a pattern that integrates a SYNC position detection code 121 and DC suppression polarity inversion pattern 124 is allocated as SYNC information (SY).

Figure 18:
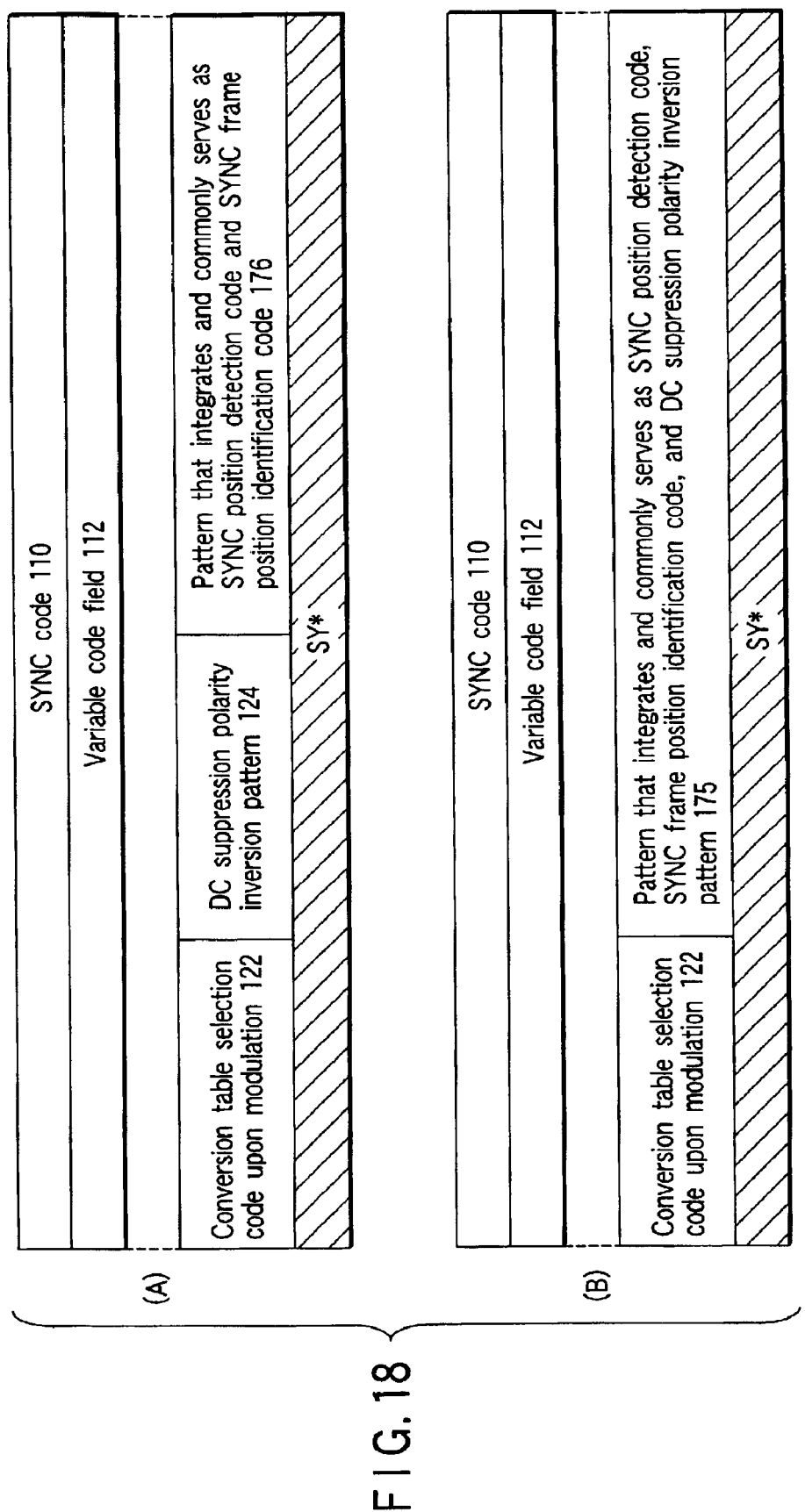
FIG. 18 shows the eighth example of the data structure of a SYNC code.

In a SYNC code 110 of an embodiment shown in portion (A) in FIG. 18, a conversion table selection code 122 upon modulation and DC suppression polarity inversion pattern 124, and a pattern that integrates a SYNC position detection code 121 and SYNC frame position identification code 123 are allocated in turn as SYNC information (SY).

In a SYNC code 110 of an embodiment shown in portion (B) in FIG. 18, a conversion table selection code 122 upon modulation, and a pattern that integrates a SYNC position detection code, SYNC frame position identification code, and DC suppression polarity inversion pattern are allocated as SYNC information (SY).

Figure 19:
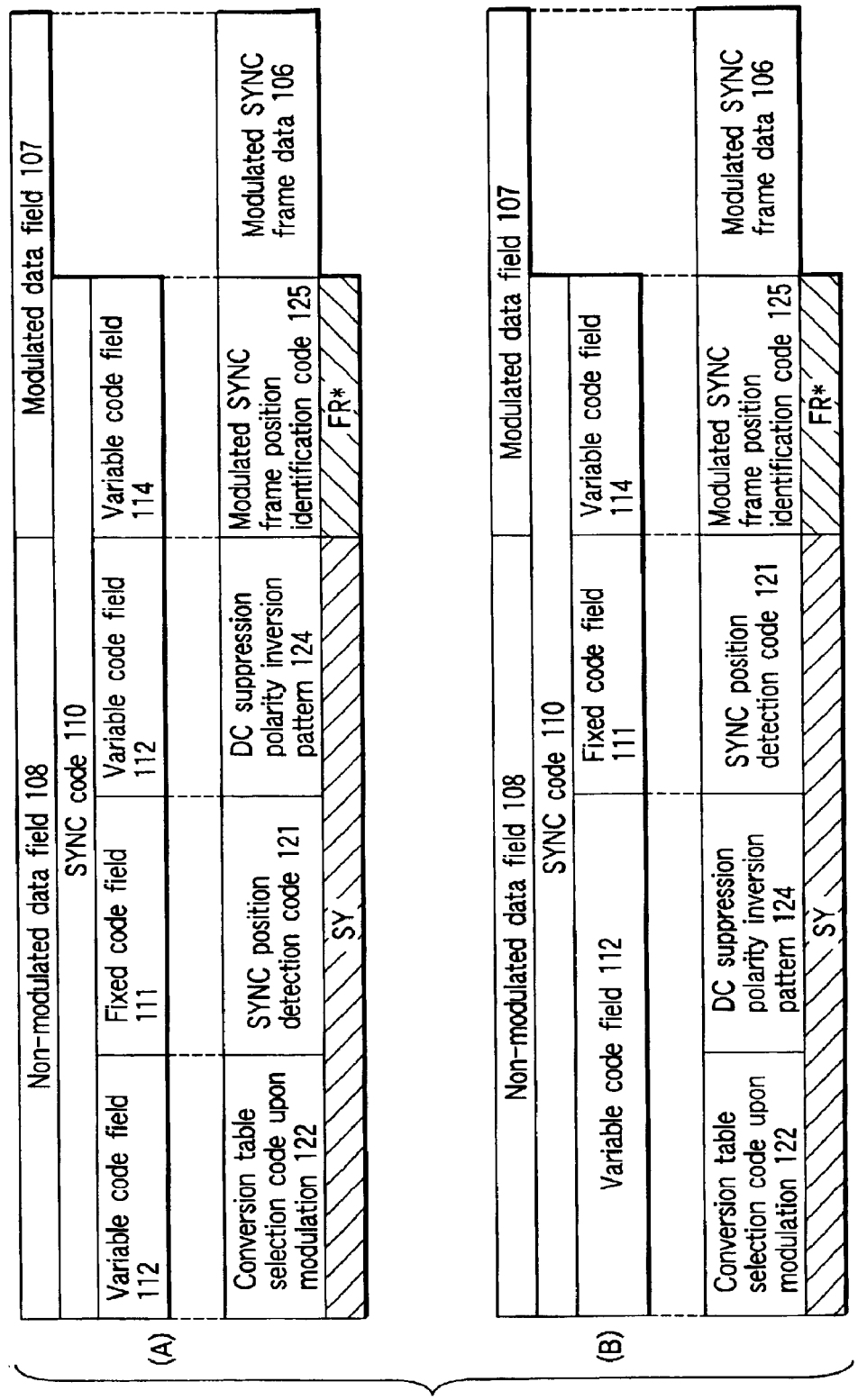
FIG. 19 shows the ninth example of the data structure of a SYNC code.

In a SYNC code 110 of an embodiment shown in portion (A) in FIG. 19, a conversion table selection code 122 upon modulation, SYNC position detection code 121, and DC suppression polarity inversion pattern 124 are allocated in turn as SYNC information (SY), and a modulated SYNC frame position identification code 125 is allocated as frame information (FR).

In a SYNC code 110 of an embodiment shown in portion (B) in FIG. 19, a conversion table selection code 122 upon modulation, DC suppression polarity inversion pattern 124, and SYNC position detection code 121 are allocated in turn as SYNC information (SY), and a modulated SYNC frame position identification code 125 is allocated as frame information (FR).

In a SYNC code 110 of an embodiment shown in FIG. 20, a pattern that integrates a conversion table selection code 122 upon modulation and DC suppression polarity inversion pattern 124 is allocated as SYNC information (SY), and a modulated SYNC frame position identification code 125 is then allocated as frame information (FR).

In a SYNC code 110 of an embodiment shown in portion (A) in FIG. 21, SYNC information (SY) alone is stored, i.e., a conversion table selection code 122 upon modulation, SYNC position detection code 121, and DC suppression polarity inversion pattern 124 are allocated in turn.

In a SYNC code 110 of an embodiment shown in portion (B) in FIG. 21, SYNC information (SY) alone is stored, i.e., a conversion table selection code 122 upon modulation, DC suppression polarity inversion pattern 124, and SYNC position detection code 121 are allocated in turn.

In a SYNC code 110 of an embodiment shown in portion (C) in FIG. 21, SYNC information (SY) alone is stored, i.e., a pattern that integrates a conversion table selection code 122 upon modulation and DC suppression polarity inversion pattern 124, and a SYNC position detection code 121 are allocated in turn.

As described above, according to the present invention, different allocation structures of a conversion table selection code 122 upon modulation, SYNC position detection code 121, SYNC frame position identification code 123, and DC suppression polarity inversion pattern 124 are available as examples of a SYNC code 110 without coming using them.

In addition, structures that combine or commonly use some of those structures are available.

FIGS. 19 and 20 show structures in which a modulated SYNC frame position identification code 125 is modulated. With such structure, the channel bit size of a non-modulated data field 108 can be reduced to improve the SYNC code detection performance.

Figure 23:
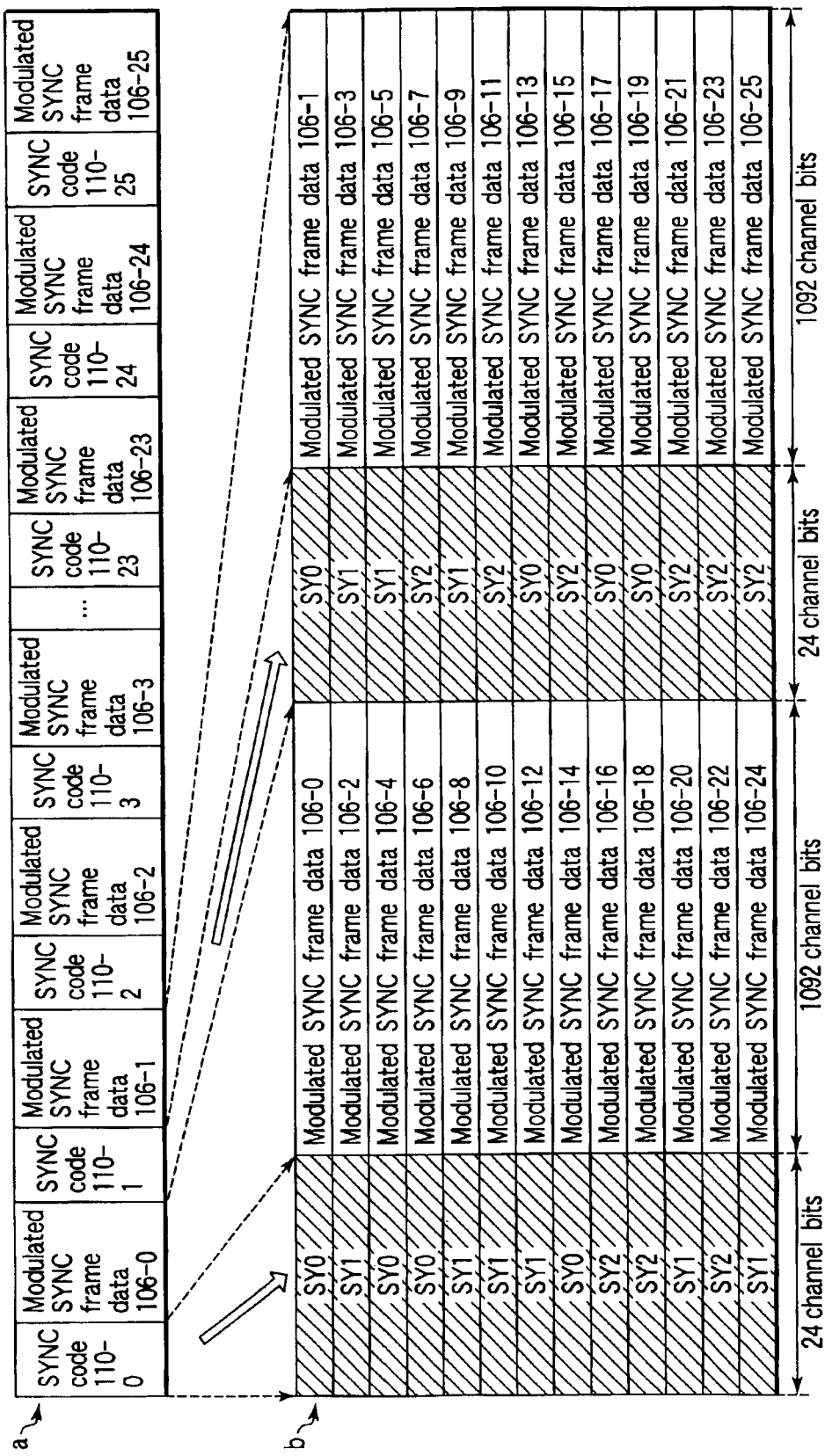
FIG. 23 shows an example of the allocation relationship between SYNC codes and modulated SYNC frame data.

FIG. 23 shows various embodiments of a SYNC code allocation method in one physical sector according to the present invention. In b of FIG. 23, a sequence of SYNC codes 110 and modulated SYNC frame data 106, which are shown in line in portion e of FIG. 2, is rearranged into a matrix pattern for the sake of easy view.

As application examples of the embodiment of the present invention, the internal structure of a SYNC code can have various structures, as shown in FIGS. 11 to 21. In order to obtain correspondence between the practical structure in each SYNC code 110 used in FIG. 23, and the structures shown in FIGS. 11 to 21, respective portions in the respective structures shown in FIGS. 11 to 21 are combined into groups "SY", "SY*", and "FR*" (* indicates a numerical value), and correspondence between the respective portions and the combined groups are shown in FIGS. 11 to 21.

In the structure shown in FIG. 23, each SYNC code has an internal structure shown in one of portion (B) in FIG. 16, portion (A) in FIG. 18, and portion (B) in FIG. 18. However, the structure of FIG. 23 has the same combination/allocation order of SYNC position numbers 115 corresponding to practical SYNC frame position identification codes 123 (commonly used as other codes/patterns).

A large characteristic feature of the present invention lies in that not only "SY0" in FIG. 23 is allocated at the first position in a single physical sector, but also identical "SY0" is also allocated at other positions (second, fifth, seventh, 14th, 15th, 18th, and 20th). Also, the next characteristic feature lies in that when one physical sector is completely segmented into two blocks (segmented into two blocks to have the last portion of modulated SYNC frame data 106-12 as a boundary), the positions of "SY0" before and after the boundary of segmentation blocks completely match.

That is, "SY0" is present immediately before modulated SYNC frame data 106-0, and "SY0" is present immediately before modulated SYNC frame data 106-13 in correspondence with it. Also, "SY0" is present immediately before modulated SYNC frame data 106-1, and "SY0" is present immediately before modulated SYNC frame data 106-14 in correspondence with it. Furthermore, "SY0" is present immediately before modulated SYNC frame data 106-4, and "SY0" is present immediately before modulated SYNC frame data 106-17 in correspondence with it.

In this way, when one physical sector is segmented into two blocks, and "SY0" is symmetrically allocated before and after the boundary of segmentation, if "SY0" is detected at an arbitrary position in a physical sector, 26 different ranges from which the position of modulated SYNC frame data 106 is to be detected in the conventional method can be halved to 13. This means that the position detection process of modulated SYNC frame data 106 can be simplified.

At the same time, the positions of "SY1" and "SY2" are symmetric and reversed before and after the boundary of segmentation. That is, "SY1" is present immediately before modulated SYNC frame data 106-2, and "SY2" that replaces "SY1" is present immediately before modulated SYNC frame data 106-15 located at a corresponding symmetric position. Also, "SY2" is present immediately before modulated SYNC frame data 106-11, and "SY1" that replaces "SY2" is present in turn immediately before modulated SYNC frame data 106-24 located at a corresponding symmetric position.

In this way, when a physical sector is segmented into two blocks, and allocations before and after the boundary of segmentation are checked, "SY0" are allocated at symmetric positions before and after the boundary of segmentation, and "SY1" and "SY2 are allocated at symmetric but reversed positions before and after the boundary of segmentation. With this allocation, since only three different codes "SY0", "SY1", and "SY2" are allocated, the position of modulated SYNC frame data 106, which is currently being reproduced can be detected by examining the continuous allocation order of SYNC codes 110.

A method of determining the position of data which is currently being reproduced in a physical sector using a sequence of a plurality of pieces of information before and after a plurality of SYNC codes 110, which are allocated based on the SYNC code allocation method shown in FIG. 23, will be described below using FIGS. 24 and 30. Note that FIGS. 25 to 29 are flow charts for explaining examples of the operations of the apparatus shown in FIGS. 3 and 4, but they will be described later.

Output data (FIG. 24) of the Viterbi decoder 156 (see FIG. 4) is transferred to the SYNC code position extractor (or detector) 145 (step ST51), which detects the position of a SYNC code 110 from that data. That is, a SYNC position detection code detector 182 which comprises a comparator detects the position of a SYNC position detection code 121 by a pattern matching method (step ST52).

Figure 24:
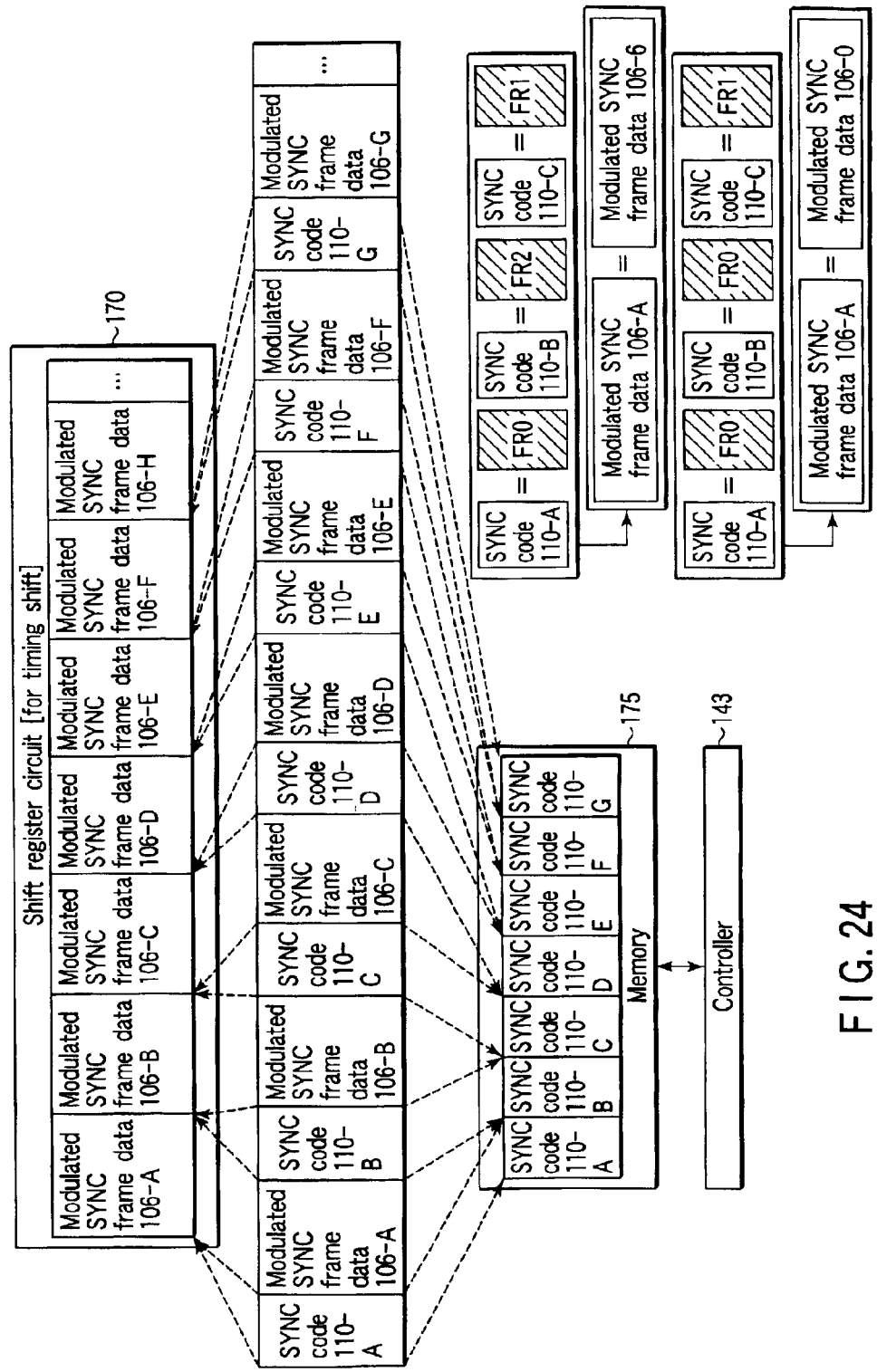
FIG. 24 is a view for explaining a method of determining the SYNC frame position in one physical sector on the basis of the order in which SYNC frame position identification codes in SYNC codes appear.

After that, information of the detected SYNC code 110 is sequentially saved in a memory 175 via the controller 143, as shown in FIG. 24. That is, a SYNC frame position identification code content identification unit 185 extracts information of a SYNC frame position identification code 123 using the detection timing of step ST52, and extraction history information is recorded in the memory 175 via the controller 143 (step ST53).

If the position of the SYNC code 110 can be detected, only modulated SYNC frame data 106 in the data output from the Viterbi decoder 156 can be extracted and transferred to the shift register circuit 170. That is, only the modulated SYNC frame data 106 is extracted using the timing of step ST52, and is transferred to the shift register circuit 170 to delay and adjust the timing (step ST54).

The controller 143 then reads out history information of SYNC codes 110, which is recorded in the memory 175, and identifies the order in which SYNC frame position identification codes appear (step ST55). Then, the position of the modulated SYNC frame data 106, which is temporarily saved in the shift register circuit 170, in a physical sector, is detected (step ST56). That is, the controller 143 determines the position of the modulated SYNC frame data 106, which is transferred to the shift register circuit 170, in a physical sector, from data which appear in an order shown in, e.g., FIG. 23, on the basis of the identified order in which SYNC frame position identification codes appear.

The modulated SYNC frame data 106 which is transferred to the shift register circuit 170 is transferred to the demodulation circuit 152 to start demodulation as needed (step ST57).

For example, as shown in FIG. 24, if a sequence of SYNC codes 110, which is saved in the memory 175 is "SY0→SY2→SY1", it is determined that "modulated SYNC frame data 106-6" is present immediately after "SY0"; if it is "SY0→SY0→SY1", it is determined that "modulated SYNC frame data 106-0" is present immediately after "SY0".

When the position in a physical sector is determined in this way, and it is confirmed that modulated SYNC frame data 106 at a desired position is input to the shift register circuit 170, that data is transferred to the demodulation circuit 152 to start demodulation (step ST57).

Figure 25:
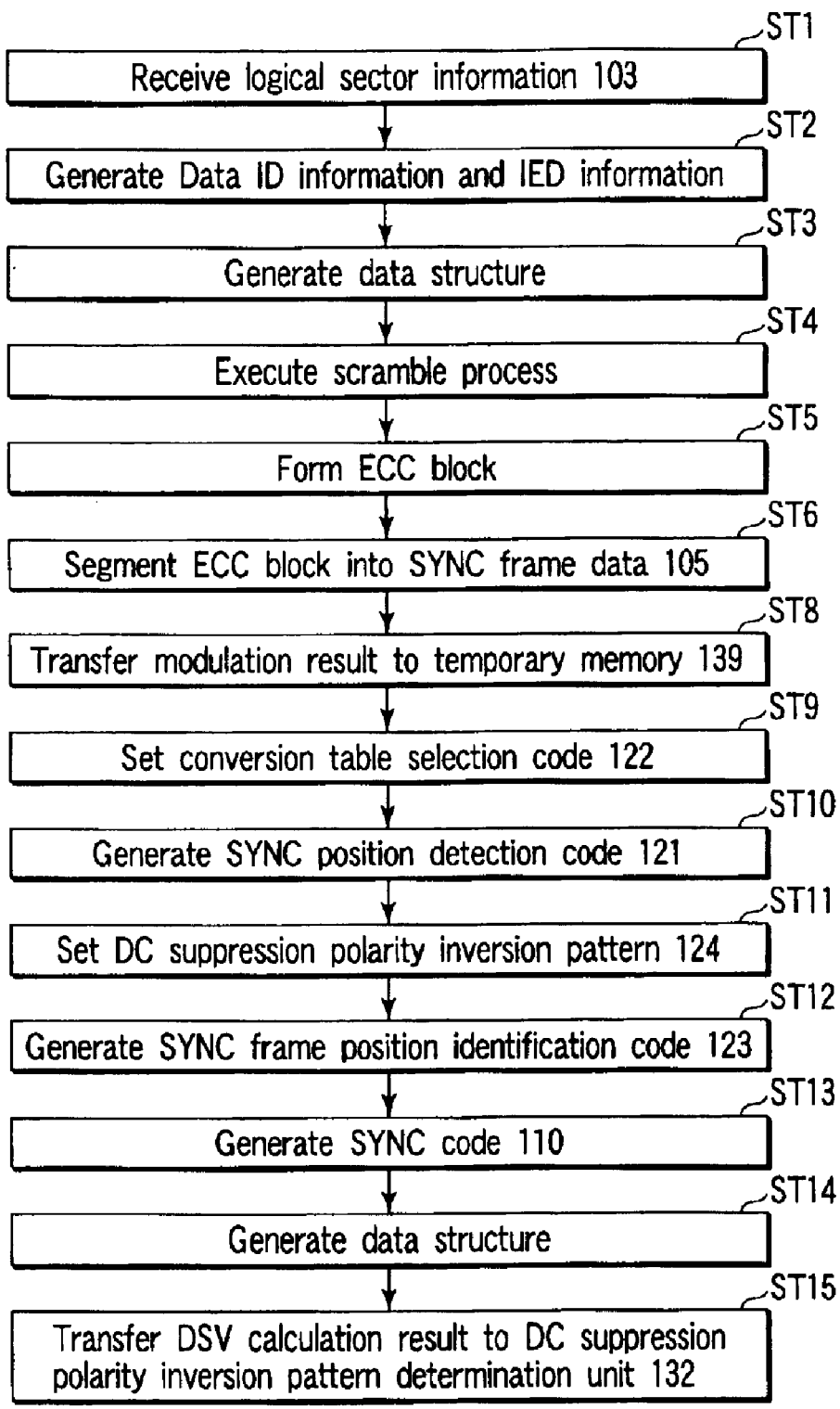
FIG. 25 is a flow chart for explaining a data conversion process upon adopting the SYNC codes shown in FIGS. 11 and 12.

FIG. 25 is a flow chart for explaining a data conversion process upon adopting the SYNC codes shown in FIGS. 11 and 12.

In step ST1, the interface 142 receives logical sector information 103 to be recorded. In step ST2, the Data ID generator 165 generates Data ID information and IED information for each sector. In step ST3, the Data ID, IED, CPR_MAI, EDC appending unit 168 generates the data structure shown in portion c in FIG. 1 or portion c in FIG. 5.

Furthermore, in step ST4 the scramble circuit 157 scrambles the logical sector information 103. In step ST5, the ECC encoding circuit 161 forms ECC blocks with the structure shown in FIGS. 5, 6, and 7.

In step ST6, a physical sector that forms each ECC block generated in the ECC encoding circuit 161 is segmented into 26 or 13 SYNC frame data 105, as shown in portion d in FIG. 1.

In step ST8, the modulation circuit 151 modulates each SYNC frame data 105, and transfers the modulated data to a temporary memory 139.

(1) Upon modulation, the DSV value calculator 148 calculates a DSV value as needed, selects a table used in modulation from the modulation conversion table memory 153 on the basis of that value, and transfers that conversion table selection information 192 to a conversion table selection information memory 133 that stores a conversion table used upon modulation.

(2) At the same time, of DSV value information 191 calculated upon modulation, a difference for each SYNC frame data 105 is transferred to a DSV difference history memory 131 that stores a difference for each SYNC frame data 105.

In step ST9, a conversion table selection code generator 134 for generating a conversion table selection code upon modulation sets a conversion table selection code 122 upon conversion on the basis of the data transferred from the conversion table selection information memory 133. The conversion table selection code 122 forms a pattern 129, which integrates and is commonly used as a conversion table selection code upon modulation, SYNC frame position identification code, and DC suppression polarity inversion pattern.

In step ST10, a SYNC position detection code generator 136 generates a SYNC position detection code 121.

In step ST11, a DC suppression polarity inversion pattern determination unit 132 sets a DC suppression polarity inversion pattern 124 on the basis of the DSV calculation result (the output from a DSV value calculator 149) for data which has been mixed by a recording data mixing unit 138 and is to be recorded by the information recording/reproducing unit 141, and the output result from a DSV difference history memory 131 for each SYNC frame data 105. The DC suppression polarity inversion pattern 124 is a code that forms the pattern 129, which integrates and is commonly used as a conversion table selection code upon modulation, SYNC frame position identification code, and DC suppression polarity inversion pattern.

In step ST12, a SYNC frame position identification code generator 135 generates a SYNC frame position identification code 123. The SYNC frame position identification code 123 is a code that forms the pattern 129, which integrates and is commonly used as a conversion table selection code upon modulation, SYNC frame position identification code, and DC suppression polarity inversion pattern.

In step ST13, a SYNC code 110 generator 137 generates a SYNC code 110 by mixing data generated in steps ST9 to ST12.

In step ST14, the recording data mixing unit 138 mixes the data generated by the SYNC code 110 generator 137 and data recorded in the modulated data temporary memory 139 to generate the data structure shown in portion e of FIG. 2.

In step ST15, the data generated in step ST14 is transferred to the information recording/reproducing unit 141, which transfers that data to the information storage medium 9. Also, the DSV value calculator 149 calculates the DSV value of that data and transfers the value to the DC suppression polarity inversion pattern determination unit 132, as needed.

Figure 26:
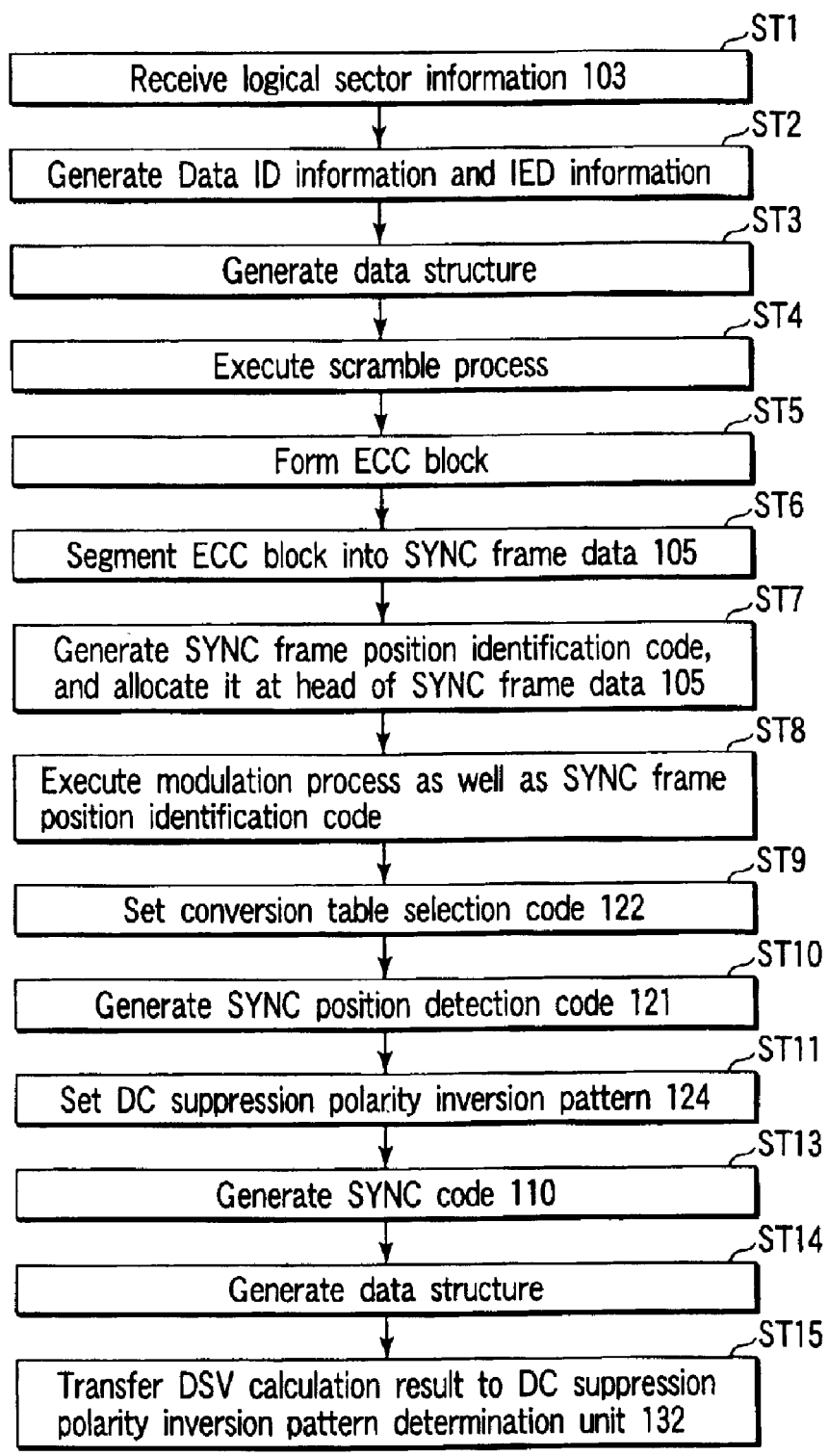
FIG. 26 is a flow chart for explaining a data conversion process upon adopting the SYNC codes shown in FIGS. 13 to 18.

FIG. 26 is a flow chart for explaining a data conversion process upon adopting the SYNC codes shown in FIGS. 13 to 18.

In step ST1, the interface 142 receives logical sector information 103 to be recorded. In step ST2, the Data ID generator 165 generates Data ID information and IED information for each sector. In step ST3, the Data ID, IED, CPR_MAI, EDC appending unit 168 generates the data structure shown in portion c in FIG. 1 or portion c in FIG. 5.

In step ST4, the scramble circuit 157 scrambles the logical sector information 103. In step ST5, the ECC encoding circuit 161 forms ECC blocks with the structure shown in portion c in FIG. 5 and portions h and i in FIGS. 6 and 7.

In step ST6, a physical sector that forms each ECC block generated in the ECC encoding circuit 161 is segmented into 26 or 13 SYNC frame data 105, as shown in portion d in FIG. 1.

In step ST7, the SYNC frame position identification code generator 136 generates a SYNC frame position identification code corresponding to the position of each modulated SYNC frame data 106 in one physical sector, as shown in portion e in FIG. 2. This SYNC frame position identification code is allocated at the head of each SYNC frame data 105 in portion d in FIG. 1 in the modulation circuit 151.

In step ST8, the modulation circuit 151 executes a modulation process as well as the SYNC frame position identification code which is allocated at the head of each SYNC frame data 105.

(1) Upon modulation, the DSV value calculator 148 calculates a DSV value as needed, selects a table used in modulation from the conversion table memory 153 that stores conversion tables to be used in modulation on the basis of that value, and transfers that conversion table selection information 192 to the memory 133 as conversion table selection information indicating a table adopted upon modulation.

(2) At the same time, of DSV value information 191 calculated upon modulation, a difference for each SYNC frame data 105 is transferred to the DSV difference history memory 131 that stores a difference for each SYNC frame data 105.

In step ST9, the conversion table selection code generator 134 for generating a conversion table selection code upon modulation sets a conversion table selection code 122 upon conversion on the basis of the data transferred from the conversion table selection information memory 133.

In step ST10, the SYNC position detection code generator 136 generates a SYNC position detection code 121.

In step ST11, the DC suppression polarity inversion pattern determination unit 132 sets a DC suppression polarity inversion pattern 124 on the basis of the DSV calculation result (the output from the DSV value calculator 149) for data which has been mixed by the recording data mixing unit 138 and is to be recorded by the information recording/reproducing unit 141, and the output result from the DSV difference history memory 131 for each SYNC frame data 105.

In step ST13, the SYNC code 110 generator 137 generates a SYNC code 110 by mixing data generated in steps ST9 to ST11.

In step ST14, the recording data mixing unit 138 mixes the data generated by the SYNC code 110 generator 137 and data recorded in the modulated data temporary memory 139 to generate the data structure shown in portion e of FIG. 2.

In step ST15, the data generated in step ST14 is transferred to the information recording/reproducing unit 141, which transfers that data to the information storage medium 9. Also, the DSV value calculator 149 calculates the DSV value of that data and transfers the value to the DC suppression polarity inversion pattern determination unit 132, as needed.

Figure 27:
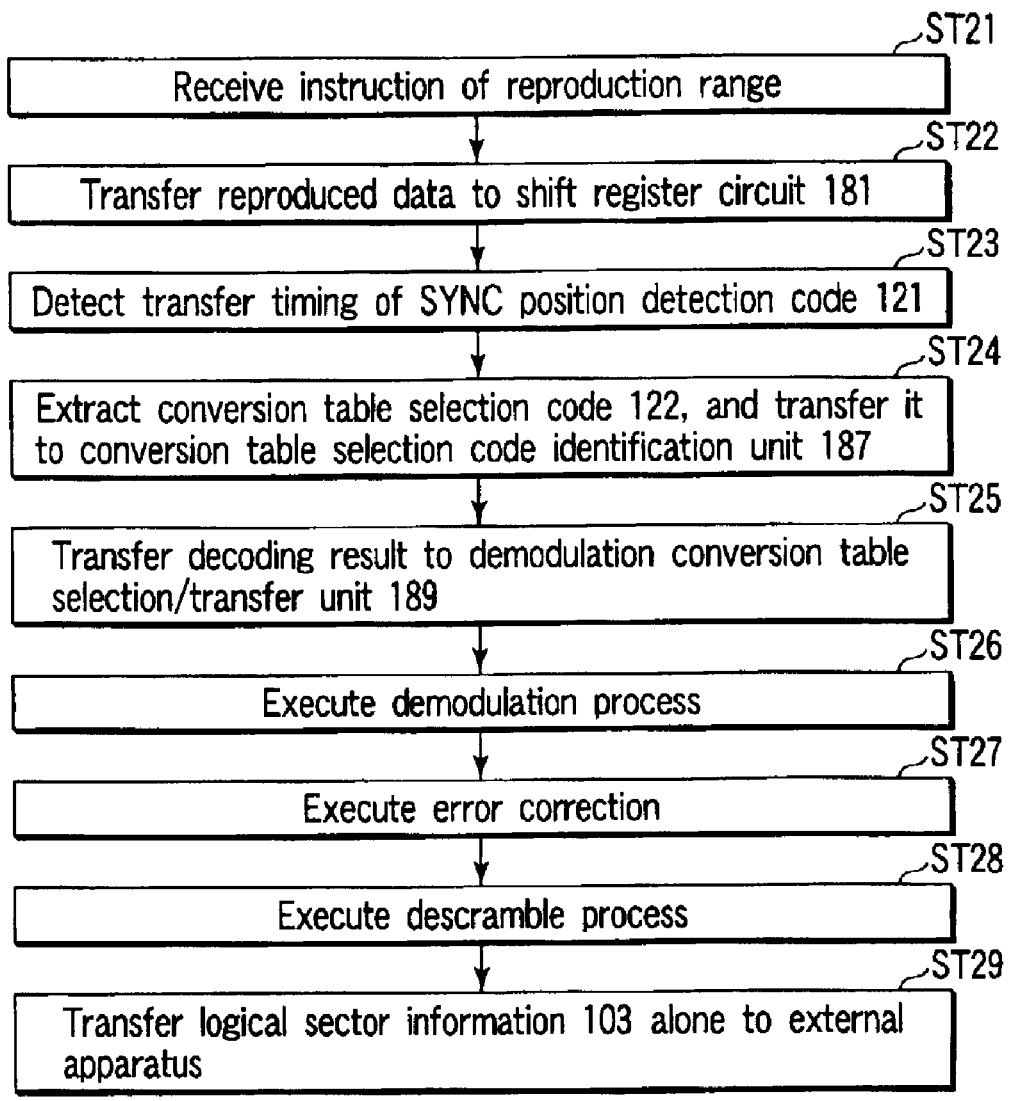
FIG. 27 is a flow chart for explaining a data conversion process upon reproducing information.

FIG. 27 is a flow chart for explaining a data conversion process upon simply reproducing information by the apparatus of the present invention.

In step ST21, the interface 142 receives an instruction of a range to be reproduced from the information storage medium 9. In step ST22, the information recording/reproduction unit 141 reproduces data that includes both SYNC codes 110 and modulated SYNC frame data 106 shown in portion e in FIG. 2, and directly transfers reproduced data to a shift register circuit 181. In step ST23, a SYNC position detection code detector 182 which comprises a comparator circuit detects the transfer timing of a SYNC position detection code 121.

In step ST24, a variable code transfer unit 183 extracts a conversion table selection code 122 upon modulation on the basis of the timing detected in step ST23, and transfers that code to the a modulation conversion table selection code identification unit 183.

In step ST25, the modulation conversion table selection code identification unit 183 decodes the conversion table selection code 122 to obtain conversion table selection information 196, and transfers the decoding result to a demodulation conversion table selection/transfer unit 189.

In step ST26, an identification unit (for identifying the contents of a SYNC frame position identification code) 185 or 186 in the SYNC code position extractor 145 or demodulation circuit 152 reads information of a SYNC frame position identification code 123 from the data transferred from the information recording/reproduction unit 141 on the basis of the timing detected in step ST23. By the method shown in FIG. 30, the position of modulated SYNC frame data 106 is determined, and a demodulation process is done using the data transferred in step ST24.

In step ST27, the ECC decoding circuit 162 makes error correction. In step ST28, the descramble circuit 159 executes a descramble process.

In step ST29, the logical sector information extractor 173 deletes Data ID, IED, CPR_MAI, and EDC, and transfers logical sector information 103 alone to an external apparatus via the interface 142.

Figure 28:
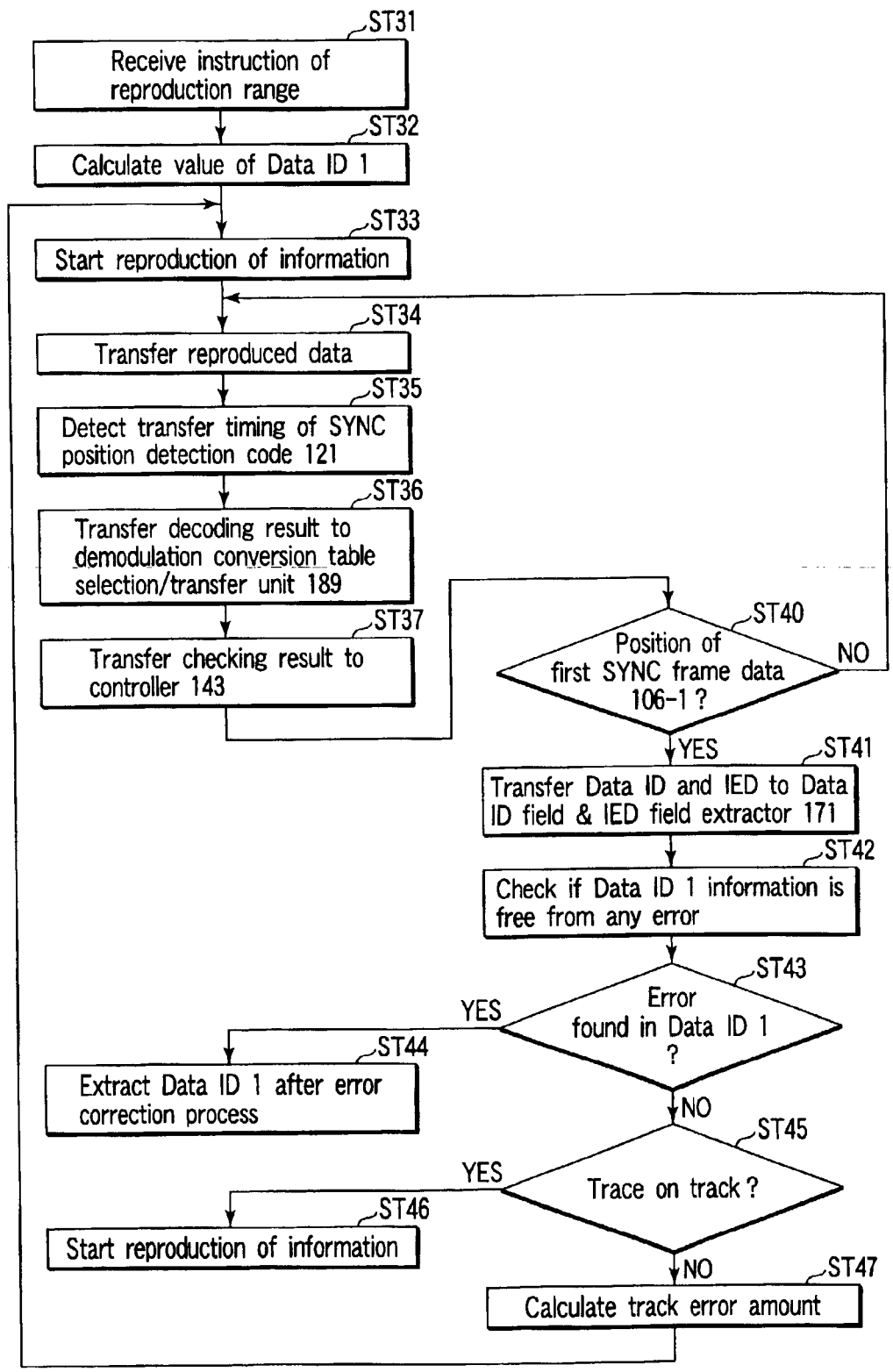
FIG. 28 is a flow chart for explaining a control operation executed when the SYNC codes shown in FIGS. 11 and 12 are adopted and access to a predetermined position on an information storage medium is made.

FIG. 28 is a flow chart for explaining the control operation when the SYNC codes shown in FIGS. 11 and 12 are adopted, and access is made to a predetermined position on the information storage medium.

In step ST31, the interface 142 receives an instruction of a range to be reproduced from the information storage medium 9. In step ST32, the controller 143 calculates the value of Data ID 1 corresponding to the reproduction start sector on the information storage medium 9 on the basis of the information received in step ST31.

In step ST33, the controller 143 controls the information recording/reproducing unit 141 to start reproduction of information from an approximate reproduction start position on the information storage medium 9. In step ST34, the information recording/reproduction unit 141 reproduces data that includes both SYNC codes 110 and modulated SYNC frame data 106 shown in portion e in FIG. 2, and directly transfers reproduced data to the shift register circuit 181.

In step ST35, the SYNC position detection code detector 182 detects the transfer timing of a SYNC position detection code 121. In step ST36, the modulation conversion table selection code identification unit 187 decodes conversion table selection information 196 using the timing detected in step ST35, and transfers the decoding result to the demodulation conversion table selection/transfer unit 189.

In step ST37, information of a SYNC frame position identification code 123 present in the variable code transfer unit 183 or a variable code transfer unit 184 is read using the timing detected in step ST35. By the method shown in FIG. 30, the position of SYNC frame data 106, which is currently being reproduced, in a physical sector is detected, and that detection result is transferred to the controller 143.

It is checked in step ST40 if the detected position of SYNC frame data is that of first SYNC frame data 106-1 in a physical sector. If YES in step ST40, Data ID 1-0 and IED 2-0 information present at the head position of first SYNC frame data 105-0 in a physical sector are transferred to the Data ID field & IED field extractor 171 using the timing detected in step ST35 in step ST41. On the other hand, if NO in step ST40, the flow returns to step ST34.

The Data ID field error checker 172 checks in step ST42 if Data ID 1 information detected using IDE 2 is free from any errors.

It is determined in step ST43 if Data ID 1 suffers any errors. If YES in step S43, the ECC decoding circuit 162 extracts Data ID 1 after an error correction process in step S44. If Data ID 1 is free from any errors, it is checked in step ST45 if a target track on the information storage medium 9 is currently being traced. If YES in step ST45, reproduction of information from the information storage medium 9 is started in step ST46. On the other hand, if NO in step ST45, the controller 143 calculates a track error amount on the information storage medium 9 on the basis of the difference between the value of Data ID 1 of the reproduction result, and Data ID 1 of a target reproduction start sector in step ST47, and the flow returns to step ST33.

Figure 29:
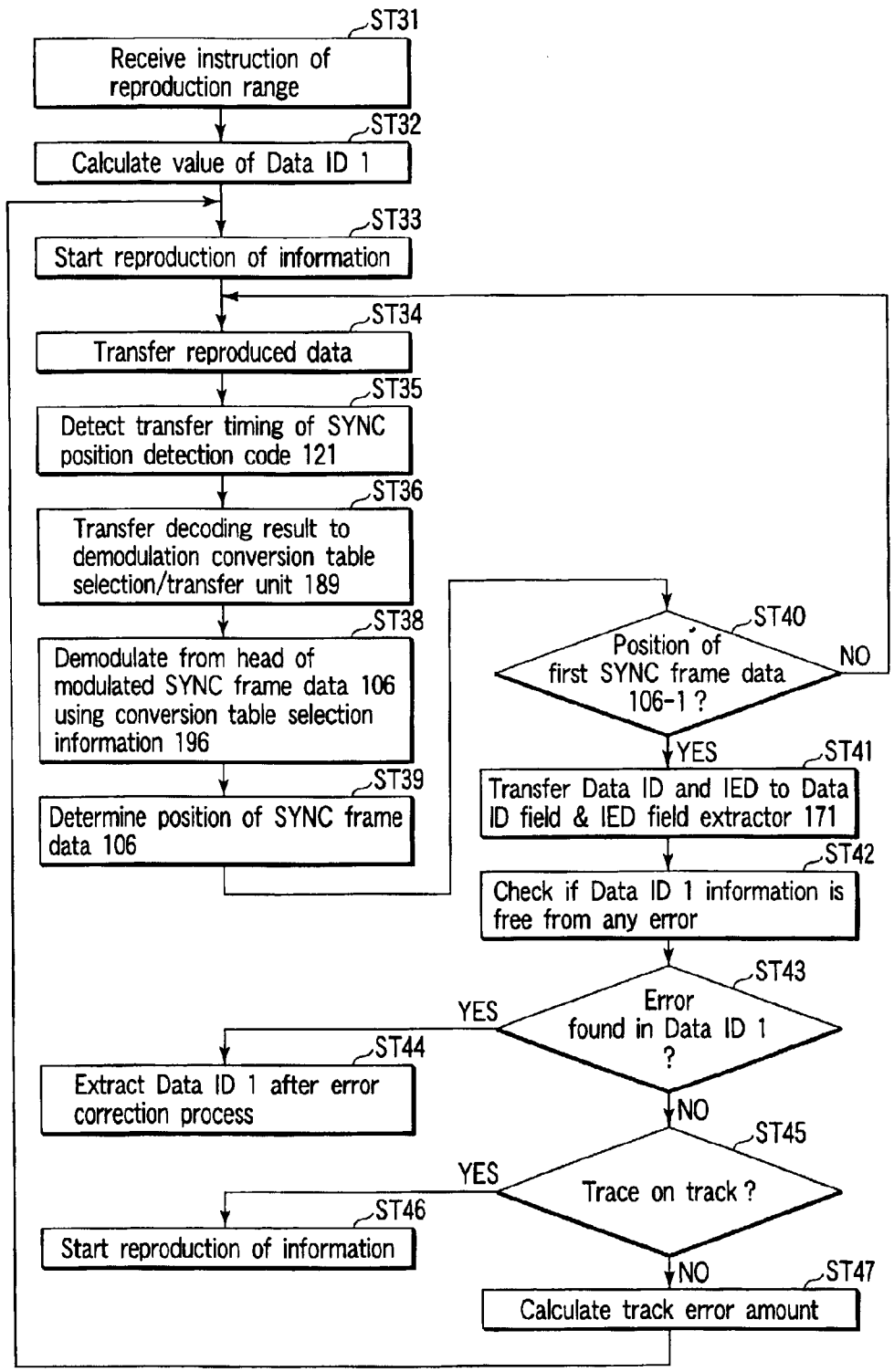
FIG. 29 is a flow chart for explaining a control operation executed when the SYNC codes shown in FIGS. 13 to 18 are adopted and access to a predetermined position on an information storage medium is made.

FIG. 29 is a flow chart for explaining the control operation when the SYNC codes shown in FIGS. 13 to 18 are adopted, and access is made to a predetermined position on the information storage medium.

In step ST31, the interface 142 receives an instruction of a range to be reproduced from the information storage medium 9. In step ST32, the controller 143 calculates the value of Data ID 1 corresponding to the reproduction start sector on the information storage medium 9 on the basis of the information received in step ST31.

In step ST33, the controller 143 controls the information recording/reproducing unit 141 to start reproduction of information from an approximate reproduction start position on the information storage medium 9.

In step ST34, the information recording/reproduction unit 141 reproduces data that includes both SYNC codes 110 and modulated SYNC frame data 106 shown in portion e in FIG. 2, and directly transfers reproduced data to the shift register circuit 181.

In step ST35, the SYNC position detection code detector 182 detects the transfer timing of a SYNC position detection code 121.

In step ST36, the modulation conversion table selection code identification unit 187 decodes conversion table selection information 196 using the timing detected in step ST35, and transfers the decoding result to the demodulation conversion table selection/transfer unit 189.

In step ST38, the demodulation circuit 152 demodulates from the head of modulated SYNC frame data 106 using the timing detected in step ST35 and the conversion table selection information 196 obtained in step ST36. At this time, demodulation starts from "modulated SYNC frame position identification code 125" located at the head of the modulated data field 107, as shown in portion (A) in FIG. 13, portion (B) in FIG. 13, and portion (A) in FIG. 14.

Figure 30:
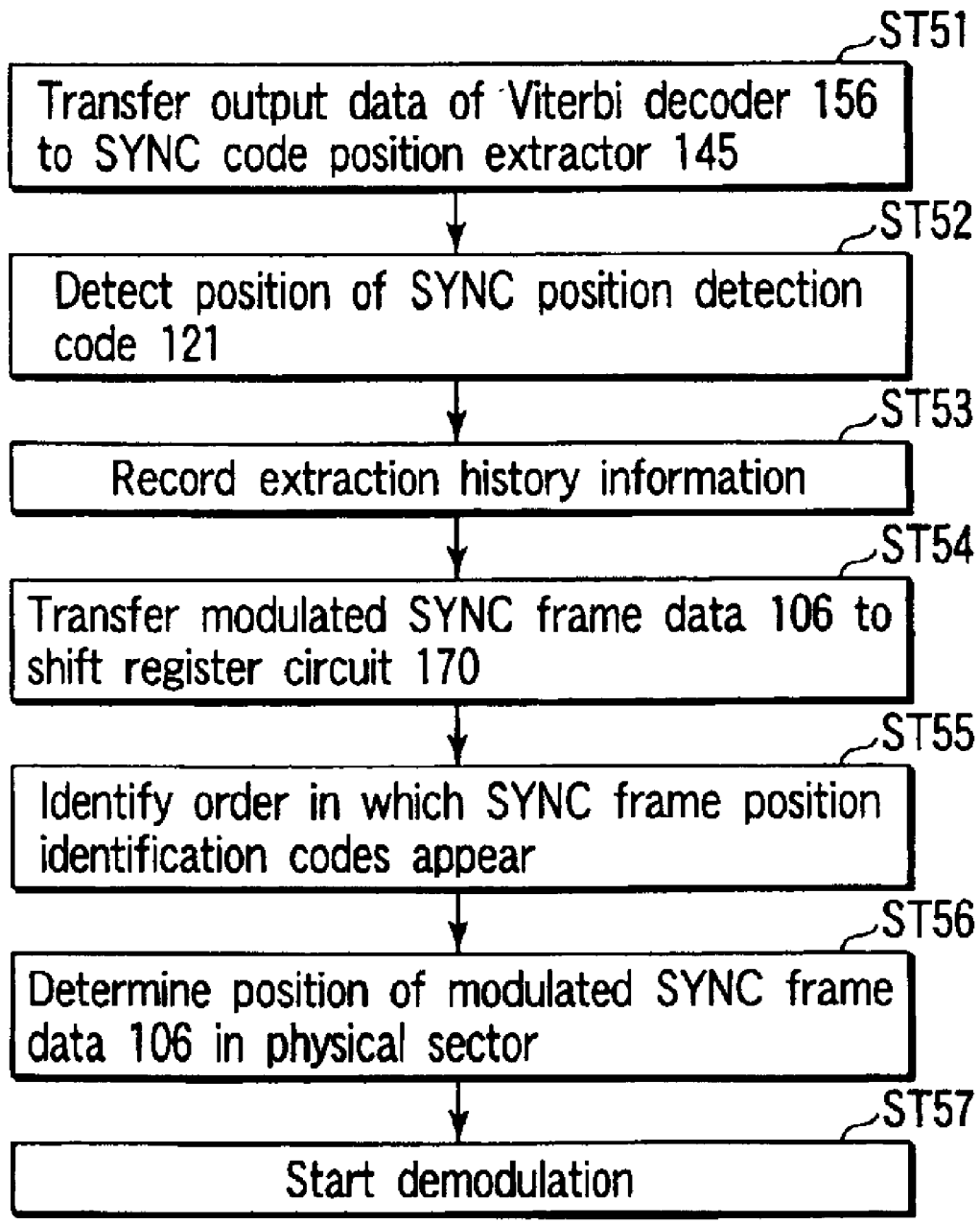
FIG. 30 is a flow chart showing the method of determining a SYNC frame in a physical sector on the basis of the order in which a plurality of SYNC codes appear.

In step ST39, the SYNC frame position identification code content identification unit 186 decodes the contents of the demodulated SYNC frame position identification code 123, and determines the position of SYNC frame data 106 by the method shown in FIG. 30.

It is checked in step ST40 if the determined position is that of first SYNC frame data 106-1 in a physical sector. If NO in step ST40, the flow returns to step ST34. If YES in step ST40, Data ID 1-0 and IED 2-0 information present at the head position of first SYNC frame data 105-0 in a physical sector are transferred to the Data ID field & IED field extractor 171 using the timing detected in step ST35 (step ST41).

The Data ID field error checker 172 checks in step ST42 if Data ID 1 information detected using information of IDE 2 is free from any errors.

It is determined in step ST43 if Data ID 1 suffers any errors. If YES in step S43, the ECC decoding circuit 162 extracts Data ID 1 after an error correction process in step S44. If Data ID 1 is free from any errors, it is checked in step ST45 if a target track on the information storage medium 9 is currently being traced. If YES in step ST45, reproduction of information from the information storage medium 9 is started (step ST46).

The controller 143 calculates a track error amount on the information storage medium 9 on the basis of the difference between the value of Data ID 1 of the reproduction result, and Data ID 1 of a target reproduction start sector in step ST47.

In the apparatus of the present invention, it is also easy to provide an abnormality detection function such as track errors by monitoring the order in which SYNC codes appear.

Figure 31:
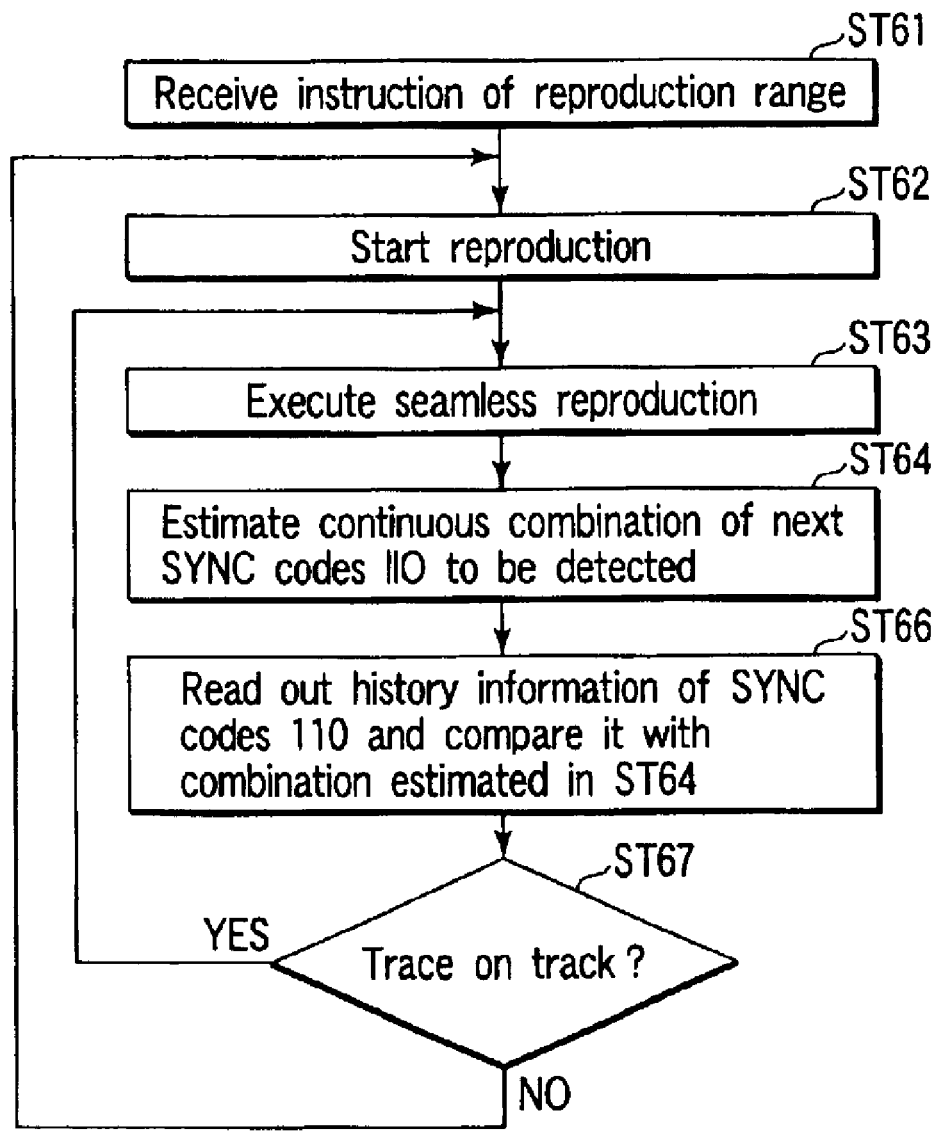
FIG. 31 is a flow chart for explaining the method of detecting abnormality such as tracking errors on the basis of the order in which a plurality of SYNC codes appear.
Figure 32:
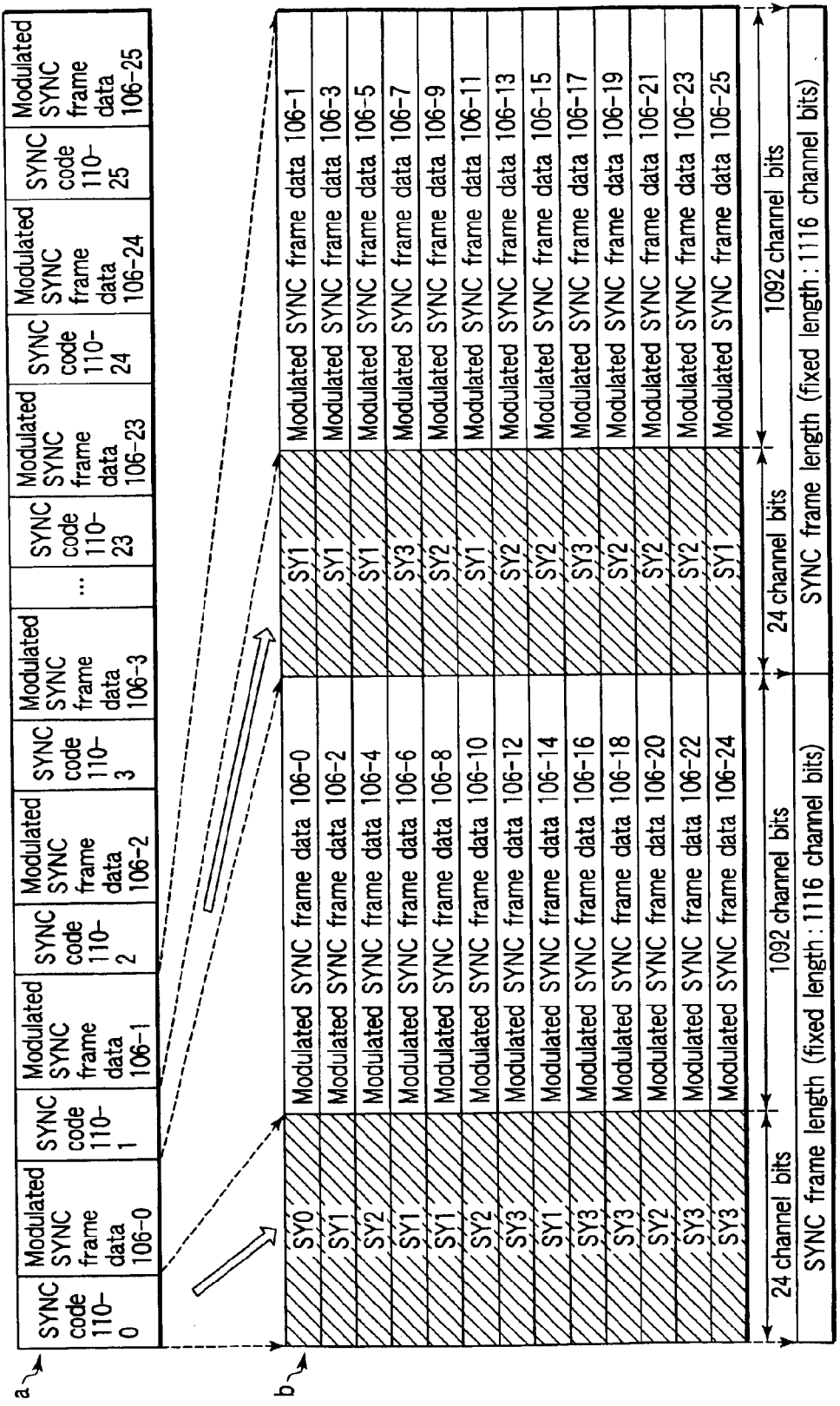
FIG. 32 is a view for explaining a SYNC code layout method in one physical sector data.

FIG. 31 shows such example. This process can also be implemented by an algorithm provided to the controller 143. In step ST61, the interface receives an instruction of a range to be reproduced from an information storage medium by an external operation input or control input. Then, access to the reproduction start position on the information storage medium is executed based on the flow chart shown in FIG. 28 or 29, thus starting data reproduction (step ST62). Then, seamless reproduction is executed according to the sequence shown in FIG. 27 (step ST63). The controller 143 predicts a continuous combination of next SYNC codes 110 to be detected (step ST64). History information of SYNC codes 110 is read out by the method according to the flow chart in FIG. 30, and is compared with the combination predicted in step ST64 (step ST66). As a result of comparison, if the history information matches the predicted combination, it is determined that a target track on the information storage medium is being traced, and the flow returns to step ST63; otherwise, the flow returns to step ST62.

The present invention will be summarized below.

(1) User information is recorded on an information storage medium in first recording units (physical sectors 5) in a format after the user information is modulated according to the (d, k; m, n) modulation rule. At this time, the present invention is characterized in that a SYNC code is allocated at least at one position in the first recording unit, and all patterns that can be used as the SYNC code satisfy a condition that the number of "1"s included in a series of N channel bits at an arbitrary position (at all positions) is equal to or smaller than $INT[N/(d+1)]$. Note that $INT[X]$ is an integer value obtained by dropping digits after the decimal point of X, and $N=\{(d+1)\times INT[9/(d+1)]\}+1$.

(2) User information is recorded on an information storage medium in first recording units (physical sectors 5) in a format after the user information is modulated according to the (d, k; m, n) modulation rule. At this time, the present invention is characterized in that a SYNC code is allocated at least at one position in the first recording unit, and at least 66% of all patterns that can be used as the SYNC code satisfy a condition that the number of "1"s included in a series of (N−1) channel bits at an arbitrary position (at all positions) is equal to or smaller than "$INT[(N-1)/(d+1)]-1$". Note that $INT[X]$ is an integer value obtained by dropping digits after the decimal point of X, and $N=\{(d+1)\times INT[9/(d+1)]\}+1$.

(3) User information is recorded on an information storage medium in first recording units (physical sectors 5) in a format after the user information is modulated according to the (d, k; m, n) modulation rule. At this time, the present invention is characterized in that a condition of d=1 is met, a SYNC code is allocated at least at one position in the first recording unit, and all patterns that can be used as the SYNC code satisfy a condition that the number of "1"s included in a series of 9 channel bits at an arbitrary position (at all positions) in the SYNC code is equal to or smaller than 4.

(4) User information is recorded on an information storage medium in first recording units (physical sectors 5) in a format after the user information is modulated according to the (d, k; m, n) modulation rule. At this time, the present invention is characterized in that a condition of d=1 is met, a SYNC code is allocated at least at one position in the first recording unit, and at least 66% of all patterns that can be used as the SYNC code satisfy a condition that the number of "1"s included in a series of 8 channel bits at an arbitrary position (at all positions) in the SYNC code is equal to or smaller than 3.

By satisfying the conditions in (1) to (4), the frequency of occurrence of the densest patterns in a SYNC code can be reduced, and that of bit shift errors in the SYNC code position can be reduced, thus improving the reliability of a reproduced signal from the SYNC code. That is, as a result of devising the SYNC code pattern by the aforementioned method, the reproduced signal amplitude value range from the SYNC code can be broadened, the reference clock extraction (carrier reproduction) prediction based on "SYNC detection" using a reproduced from the SYNC code position can be improved, and the frequency of occurrence of timing errors (bit shifts) of a reference clock at the SYNC code position can be reduced, thus improving the detection precision of the SYNC code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
   a management area that stores management information; and
   a data area that stores predetermined data in predetermined recording units,
   wherein the predetermined data is modulated according to a (d, k; m, n) modulation rule,
   the (d, k; m, n) modulation rule modulates m-bit source data into n-channel bit data, so that modulated channel bit patterns satisfy conditions that a minimum d pieces of 0s successively arranged and a maximum of k pieces of 0s successively arranged,
   the predetermined data includes a plurality of SYNC codes in the predetermined recording unit,
   the number of 1s included in a predetermined number of a series of channel bits at an arbitrary position in the SYNC code is not more than a half the predetermined number,
   each of the plurality of SYNC codes includes a fixed code and a variable code,
   wherein the fixed code includes k or more sequences of 0s successively arranged and d+1 sequences of 0s successively arranged,
   wherein the variable code is one of a first pattern, a second pattern and a pattern other than the first pattern and second pattern, and
   combinations of the variable codes of three successive SYNC codes in the predetermined recording unit are different from one another.

2. A medium according to claim 1, wherein all patterns contained in the SYNC code satisfy a condition that the number of 1s included in a series of N channel bits is not more than $INT[N/(d+1)]$
   where $INT[X]$ is an integer value obtained by dropping digits after the decimal point of X, and
   N is given by $N=\{(d+1)\times INT[9/(d+1)]\}+1$.

3. A medium according to claim 1, wherein nor less than 66% of patterns contained in the SYNC code satisfy a condition that the number of 1s included in a series of (N−1) channel bits is not more than $INT[(N-1)/(d+1)]-1$
   where $INT[X]$ is an integer value obtained by dropping digits after the decimal point of X, and
   N is given by $N=\{(d+1)\times INT[9/(d+1)]\}+1$.

4. A medium according to claim 1, wherein the predetermined data stored in said information storage medium is modulated according to a (l, k; m, n) modulation rule, and
   all patterns contained in the SYNC code satisfy a condition that the number of 1s included in a series of 9 channel bits is not more than 4.

5. A medium according to claim 1, wherein the predetermined data stored in said information storage medium is modulated according to a (l, k; m, n) modulation rule, and not less than 66% of patterns contained in the SYNC code satisfy a condition that the number of 1s included in a series of 8 channel bits is not more than 3.

6. An information recording apparatus for recording information on an information storage medium, comprising;

a generation unit configured to generate predetermined data; and a recording unit configured to record the predetermined data, wherein the predetermined data is modulated according to a (d, k; m, n) modulation rule, the (d, k; m, n) modulation rule modulates m-bit source data into n-channel bit data, so that modulated channel bit patterns satisfy conditions that a minimum of d pieces of 0s successively arranged and a maximum of k pieces 0s successively arranged, the predetermined data includes a plurality of SYNC codes in the predetermined recording unit, the number of "1"s included in a predetermined number of a series of channel bits at an arbitrary position in the SYNC code is not more than a half the predetermined number, each of the plurality of SYNC codes includes a fixed code and a variable code, wherein the fixed code includes k or more sequences of 0s successively arranged and d+1 sequences of 0s successively arranged, wherein the variable code is one of a first pattern, a second pattern and a pattern other than the first pattern and second pattern, wherein the variable code of the lead of the SYNC codes in the predetermined recording unit is the first pattern, and combinations of the variable codes of three successive SYNC codes in the predetermined recording unit are different from one another.

7. An apparatus according to claim 6, wherein all patterns contained in the SYNC code satisfy a condition that the number of 1s included in a series of N channel bits is not more than INT[N/(d+1)]

where INT[X] is an integer value obtained by dropping digits after the decimal point of X, and N is given by N={(d+1)×INT[9/(d+1)]}+1.

8. An apparatus according to claim 6, wherein not less than 66% of patterns contained in the SYNC code satisfy a condition that the number of 1s included in a series of (N−1) channel bits is not more than INT[(N−1)/(d+1)]−1 where INT[X] is an integer value obtained by dropping digits after the decimal point of X, and N is given by N={(d+1)×INT[9/(d+1)]}+1.

9. An information reproduction apparatus for reproducing information from an information storage medium, comprising:

a read unit configured to read out predetermined data from the information storage medium, and a reproduction unit configured to reproduce various data on the basis of a SYNC code contained in the predetermined data, wherein the predetermined data is modulated according to a (d, k; m, n) modulation rule, the (d, k; m, n) modulation rule modulates m-bit source data into n-channel bit data, so that modulated channel bit patterns satisfy conditions that a minimum of d pieces of 0s successively arranged and a maximum of k pieces of 0s successively arranged, the predetermined data includes plurality of SYNC codes in the predetermined recording unit, the number of 1s included in a predetermined number of a series of channel bits at an arbitrary position in the SYNC code is not more than a half the predetermined number, each of the plurality of SYNC codes includes a fixed code and a variable code, wherein the fixed code includes k or more sequences of 0s successively arranged and d+1 sequences of 0s successively arranged, wherein the variable code is one of a first pattern, a second pattern and a pattern other than the first pattern and second pattern, and combinations of the variable codes of three successive SYNC codes in the predetermined recording unit are different from one another.

10. An apparatus according to claim 9, wherein all patterns contained in the SYNC code satisfy a condition that the number of 1s included in a series of N channel bits is not more than INT[N/(d+1)]

where INT[X] is an integer value obtained by dropping digits after the decimal point of X, and N is given by N={(d+1)×INT[9/(d+1)]}+1.

11. An apparatus according to claim 9, wherein not less than 66% of patterns contained in the SYNC code satisfy a condition that the number of 1s included in a series of (N−1) channel bits is not more than INT[(N−1)/(d+1)]−1 where INT[X] is an integer value obtained by dropping digits after the decimal point of X, and N is given by N={(d+1)×INT[9/(d+1)]}+1.

* * * * *